United States Patent
Pietrzak et al.

(10) Patent No.: US 11,889,883 B2
(45) Date of Patent: *Feb. 6, 2024

(54) SYSTEM AND METHOD FOR FORMING A PROTECTIVE HELMET FOR A CUSTOMER'S HEAD

(71) Applicant: Bell Sports, Inc., Scotts Valley, CA (US)

(72) Inventors: Christopher T. Pietrzak, Ben Lomond, CA (US); Michael W. Lowe, Santa Cruz, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,292

(22) Filed: Aug. 22, 2022

(65) Prior Publication Data

US 2022/0400806 A1 Dec. 22, 2022

Related U.S. Application Data

(63) Continuation of application No. 17/201,813, filed on Mar. 15, 2021, now Pat. No. 11,419,383, which is a
(Continued)

(51) Int. Cl.
*A61B 3/00* (2006.01)
*A63B 71/10* (2006.01)
(Continued)

(52) U.S. Cl.
CPC ............... *A42C 2/007* (2013.01); *A41H 3/04* (2013.01); *B33Y 10/00* (2014.12); *B33Y 50/02* (2014.12);
(Continued)

(58) Field of Classification Search
CPC ........ A42C 2/007; B33Y 10/00; B33Y 50/02; A41H 3/04; G05B 19/4099;
(Continued)

(56) References Cited

U.S. PATENT DOCUMENTS 676,293 A 6/1901 Wright
1,655,007 A 1/1928 Boettge
(Continued)

FOREIGN PATENT DOCUMENTS

CA 2778050 A1 4/2011
CN 1735921 2/2006
(Continued)

OTHER PUBLICATIONS

Cai et al., A shape-based helmet fitting system for concussion protection, 4 pages (Year: 2015).*
(Continued)

*Primary Examiner* — Thuy Dao
(74) *Attorney, Agent, or Firm* — Barnes & Thornburg LLP

(57) ABSTRACT

A custom-fitted helmet and a method of making the same can comprise, at a first location, obtaining head data for a customer's head comprising a length, a width, and at least one head contour. With at least one processor, generating a computerized three-dimensional (3D) headform matching the customer's head length, width, and head contour from the head data. The 3D headform can be compared to a helmet safety standard. At a second location different from the first location, a custom-fitted helmet based on the 3D headform can be formed, wherein the custom-fitted helmet satisfies the safety standard and comprises an inner surface comprising a topography that conforms to the length, width, and at least one contour of the customer's head. The first location can be a home or a store. Obtaining the head data
(Continued)

from photographic images of a deformable interface member disposed on the customer's head.

27 Claims, 12 Drawing Sheets

Related U.S. Application Data continuation of application No. 17/026,475, filed on Sep. 21, 2020, now Pat. No. 10,948,898, which is a continuation of application No. 16/231,805, filed on Dec. 24, 2018, now abandoned, which is a continuation of application No. 14/156,269, filed on Jan. 15, 2014, now Pat. No. 10,159,296.

(60) Provisional application No. 61/883,087, filed on Sep. 26, 2013, provisional application No. 61/875,603, filed on Sep. 9, 2013, provisional application No. 61/812,666, filed on Apr. 16, 2013, provisional application No. 61/754,469, filed on Jan. 18, 2013.

(51) Int. Cl.
*G06F 9/445* (2018.01)
*G06F 9/455* (2018.01)
*A42C 2/00* (2006.01)
*B33Y 10/00* (2015.01)
*B33Y 50/02* (2015.01)
*A41H 3/04* (2006.01)
*G05B 19/4099* (2006.01)

(52) U.S. Cl.
CPC ............ *G05B 19/4099* (2013.01); *G05B 2219/35217* (2013.01); *G05B 2219/49023* (2013.01)

(58) Field of Classification Search
CPC ........... G05B 2219/35217; G05B 2219/49023; A63B 71/10; A42B 3/06; A42B 3/328
See application file for complete search history.

(56) References Cited

U.S. PATENT DOCUMENTS

| | | |
|---|---|---|
| 1,808,966 A | 6/1931 | Morgan |
| 1,841,232 A | 1/1932 | Wells |
| 2,140,716 A | 12/1938 | Pryale |
| 2,293,308 A | 8/1942 | Riddell, Sr. |
| 2,296,335 A | 9/1942 | Brady |
| 3,039,109 A | 6/1962 | Simpson |
| 3,116,490 A | 1/1964 | Zbikowski |
| 3,153,792 A | 10/1964 | Marietta |
| 3,186,004 A | 6/1965 | Carlini |
| 3,197,784 A | 8/1965 | Richard |
| 3,208,080 A | 9/1965 | Hirsch |
| 3,273,162 A | 9/1966 | Andrews, III |
| 3,296,582 A | 1/1967 | Ide |
| 3,344,433 A | 10/1967 | Stapenhill |
| 3,364,499 A | 1/1968 | Kwoka |
| 3,447,162 A | 6/1969 | Aileo |
| 3,447,163 A | 6/1969 | Bothwell |
| 3,462,763 A | 8/1969 | Schneider |
| 3,501,772 A | 3/1970 | Wyckoff |
| 3,551,911 A | 1/1971 | Holden |
| 3,566,409 A | 3/1971 | Hopper |
| 3,568,210 A | 3/1971 | Marietta |
| 3,582,990 A | 6/1971 | Frieder |
| 3,590,388 A | 7/1971 | Holt |
| 3,600,714 A | 8/1971 | Greathouse |
| 3,609,764 A | 10/1971 | Morgan |
| 3,616,463 A | 11/1971 | Theodore et al. |
| 3,629,864 A | 12/1971 | Latina |
| 3,713,640 A | 1/1973 | Margan |
| 3,729,744 A | 5/1973 | Rappleyea |
| 3,761,959 A | 10/1973 | Dunning |
| 3,785,395 A | 1/1974 | Andreasson |
| 3,815,152 A | 6/1974 | Bednarczuk |
| 3,818,508 A | 6/1974 | Ammers |
| 3,820,163 A | 6/1974 | Rappleyea |
| 3,843,970 A | 10/1974 | Marietta |
| 3,860,966 A | 1/1975 | Brown |
| 3,872,511 A | 3/1975 | Nichols |
| 3,882,547 A | 5/1975 | Morgan |
| 3,897,597 A | 8/1975 | Kasper |
| 3,946,441 A | 3/1976 | Johnson |
| 3,992,721 A | 11/1976 | Morton |
| 3,999,220 A | 12/1976 | Keltner |
| 4,006,496 A | 2/1977 | Marker |
| 4,023,209 A | 5/1977 | Frieder |
| 4,023,213 A | 5/1977 | Rovani |
| 4,038,700 A | 8/1977 | Gyory |
| 4,054,953 A | 10/1977 | De Barsy |
| 4,060,855 A | 12/1977 | Rappleyea |
| 4,064,565 A | 12/1977 | Griffiths |
| 4,101,983 A | 7/1978 | Dera |
| 4,134,155 A | 1/1979 | Robertson |
| 4,168,542 A | 9/1979 | Small |
| 4,239,106 A | 12/1980 | Aileo |
| 4,282,610 A | 8/1981 | Steigerwald |
| 4,287,613 A | 9/1981 | Schulz |
| 4,300,242 A | 11/1981 | Nava |
| 4,307,471 A | 12/1981 | Lovell |
| 4,345,338 A | 8/1982 | Frieder, Jr. |
| 4,354,284 A | 10/1982 | Gooding |
| D267,287 S | 12/1982 | Gooding |
| 4,375,108 A | 3/1983 | Gooding |
| 4,404,690 A | 9/1983 | Farquharson |
| 4,432,099 A | 2/1984 | Grick |
| 4,466,138 A | 8/1984 | Gessalin |
| 4,478,587 A | 10/1984 | Mackal |
| 4,534,068 A | 8/1985 | Mitchell |
| 4,558,470 A | 12/1985 | Mitchell |
| 4,566,137 A | 1/1986 | Gooding |
| 4,586,200 A | 5/1986 | Poon |
| 4,665,569 A | 5/1987 | Santini |
| 4,724,549 A | 2/1988 | Herder |
| 4,766,614 A | 8/1988 | Cantwell |
| 4,776,043 A | 10/1988 | Coleman |
| 4,853,980 A | 8/1989 | Zarotti |
| 4,903,346 A | 2/1990 | Reddemann |
| 4,916,759 A | 4/1990 | Arai |
| 4,937,888 A | 7/1990 | Straus |
| 4,982,452 A | 1/1991 | Chaise |
| 4,996,724 A | 3/1991 | Dextrase |
| 5,014,365 A | 5/1991 | Schulz |
| 5,023,958 A | 6/1991 | Rotzin |
| 5,031,246 A | 7/1991 | Kronenberger |
| 5,035,009 A | 7/1991 | Wingo, Jr. |
| 5,056,162 A | 10/1991 | Tirums |
| 5,101,517 A | 4/1992 | Douglas |
| 5,101,580 A | 4/1992 | Lyden |
| 5,136,728 A | 8/1992 | Kamata |
| 5,150,479 A | 9/1992 | Oleson |
| 5,175,889 A | 1/1993 | Infusino |
| 5,204,998 A | 4/1993 | Liu |
| 5,221,088 A | 6/1993 | McTeigue |
| 5,263,203 A | 11/1993 | Kraemer |
| 5,271,103 A | 12/1993 | Darnell |
| 5,298,208 A | 3/1994 | Sibley |
| 5,309,576 A | 5/1994 | Broersma |
| 5,327,588 A | 7/1994 | Garneau |
| 5,345,614 A | 9/1994 | Tanaka |
| 5,383,363 A | 1/1995 | Kulmaczewski |
| 5,450,631 A | 9/1995 | Egger |
| 5,461,730 A | 10/1995 | Carrington |
| D364,487 S | 11/1995 | Tutton |
| 5,475,878 A | 12/1995 | Dawn |
| 5,515,546 A | 5/1996 | Shifrin |
| 5,517,691 A | 5/1996 | Blake |
| 5,517,695 A | 5/1996 | Murray |
| 5,518,802 A | 5/1996 | Colvin |
| 5,522,091 A | 6/1996 | Rudolf |

(56) References Cited

U.S. PATENT DOCUMENTS

| | | |
|---|---|---|
| 5,553,330 A | 9/1996 | Carveth |
| 5,561,866 A | 10/1996 | Ross |
| 5,615,132 A | 3/1997 | Horton |
| 5,645,077 A | 7/1997 | Foxlin |
| 5,661,854 A | 9/1997 | March, II |
| 5,666,670 A | 9/1997 | Ryan |
| 5,708,988 A | 1/1998 | Mcguine |
| 5,713,082 A | 2/1998 | Bassette |
| 5,732,414 A | 3/1998 | Monica |
| 5,745,028 A | 4/1998 | Hock |
| 5,774,901 A | 7/1998 | Minami |
| 5,787,513 A | 8/1998 | Sharmat |
| 5,794,271 A | 8/1998 | Hastings |
| 5,819,206 A | 10/1998 | Horton |
| 5,829,065 A | 11/1998 | Cahill |
| 5,833,796 A | 11/1998 | Matich |
| 5,867,840 A | 2/1999 | Hirosawa |
| 5,891,372 A | 4/1999 | Besset |
| 5,930,840 A | 8/1999 | Arai |
| 5,940,890 A | 8/1999 | Dallas |
| 5,941,272 A | 8/1999 | Feldman |
| 5,943,706 A | 8/1999 | Miyajima |
| 5,950,243 A | 9/1999 | Winters |
| 5,950,244 A | 9/1999 | Fournier |
| 5,953,761 A | 9/1999 | Jurga |
| 5,956,777 A | 9/1999 | Popovich |
| 6,002,994 A | 12/1999 | Lane |
| 6,009,563 A | 1/2000 | Swanson |
| 6,032,297 A | 3/2000 | Barthold |
| 6,032,530 A | 3/2000 | Hock |
| 6,070,271 A | 6/2000 | Williams |
| 6,073,271 A | 6/2000 | Alexander |
| 6,088,840 A | 7/2000 | Im |
| 6,090,044 A | 7/2000 | Bishop |
| 6,128,786 A | 10/2000 | Maddux |
| 6,131,196 A | 10/2000 | Vallion |
| 6,138,284 A | 10/2000 | Arai |
| 6,154,889 A | 12/2000 | Moore, III |
| 6,178,560 B1 | 1/2001 | Halstead |
| D437,472 S | 2/2001 | Ruscitti |
| 6,186,145 B1 | 2/2001 | Brown |
| 6,189,156 B1 | 2/2001 | Loiars |
| 6,219,850 B1 | 4/2001 | Halstead |
| 6,226,801 B1 | 5/2001 | Alexander |
| 6,272,692 B1 | 8/2001 | Abraham |
| 6,282,724 B1 | 9/2001 | Abraham |
| 6,292,952 B1 | 9/2001 | Watters |
| 6,298,483 B1 | 10/2001 | Schiebl |
| 6,298,497 B1 | 10/2001 | Chartrand |
| 6,301,718 B1 | 10/2001 | Rigal |
| 6,305,030 B1 | 10/2001 | Brignone |
| 6,314,586 B1 | 11/2001 | Duguid |
| 6,332,228 B1 | 12/2001 | Takahara |
| 6,339,849 B1 | 1/2002 | Nelson |
| 6,351,853 B1 | 3/2002 | Halstead |
| 6,360,376 B1 | 3/2002 | Carrington |
| 6,378,140 B1 | 4/2002 | Abraham |
| 6,385,780 B1 | 5/2002 | Racine |
| 6,389,607 B1 | 5/2002 | Wood |
| 6,421,841 B2 | 7/2002 | Ikeda |
| 6,434,755 B1 | 8/2002 | Halstead |
| 6,442,765 B1 | 9/2002 | Fallon |
| 6,446,270 B1 | 9/2002 | Durr |
| D465,067 S | 10/2002 | Ide |
| 6,463,351 B1 | 10/2002 | Clynch |
| 6,467,099 B2 | 10/2002 | Dennis |
| 6,532,602 B2 | 3/2003 | Watters |
| D475,486 S | 6/2003 | Ide |
| 6,588,022 B1 | 7/2003 | Anders |
| 6,604,246 B1 | 8/2003 | Obreja |
| 6,611,789 B1 | 8/2003 | Darley |
| 6,658,671 B1 | 12/2003 | Von Holst |
| 6,730,047 B2 | 5/2004 | Socci |
| D492,818 S | 7/2004 | Ide |
| 6,785,985 B2 | 9/2004 | Marvin |
| 6,798,392 B2 | 9/2004 | Hartwell |
| 6,826,509 B2 | 11/2004 | Crisco, III |
| 6,925,657 B2 | 8/2005 | Takahashi |
| 6,931,671 B2 | 8/2005 | Skiba |
| 6,934,971 B2 | 8/2005 | Ide |
| D521,191 S | 5/2006 | Berger |
| 7,054,784 B2 | 5/2006 | Flentov |
| D523,180 S | 6/2006 | Frye |
| 7,062,795 B2 | 6/2006 | Skiba |
| 7,111,329 B2 | 9/2006 | Stroud |
| 7,234,812 B2 * | 6/2007 | Piorkowski ............ A42C 2/007 33/645 |
| 7,240,376 B2 | 7/2007 | Ide |
| 7,243,378 B2 | 7/2007 | Desarmaux |
| 7,254,843 B2 | 8/2007 | Talluri |
| 7,341,776 B1 | 3/2008 | Milliren |
| D570,055 S | 5/2008 | Ferrara |
| D582,607 S | 12/2008 | Ferrara |
| 7,328,462 B1 | 12/2008 | Straus |
| D586,507 S | 2/2009 | Fink |
| 7,526,389 B2 | 4/2009 | Greenwald |
| D603,099 S | 10/2009 | Bologna |
| 7,634,820 B2 | 12/2009 | Rogers |
| 7,673,351 B2 | 3/2010 | Copeland |
| D617,503 S | 6/2010 | Szalkowski |
| 7,735,157 B2 | 6/2010 | Ikeda |
| 7,743,640 B2 | 6/2010 | Lampe |
| 7,774,866 B2 | 8/2010 | Ferrara |
| 7,802,320 B2 | 9/2010 | Morgan |
| 7,832,023 B2 | 11/2010 | Crisco |
| 7,841,025 B1 | 11/2010 | Fink |
| 7,849,524 B1 | 12/2010 | Williamson |
| 7,870,617 B2 | 1/2011 | Butler |
| 7,917,972 B1 | 4/2011 | Krueger |
| 7,930,771 B2 | 4/2011 | Depreitere |
| 7,952,577 B2 | 5/2011 | Harvill |
| 7,987,525 B2 | 8/2011 | Summers |
| 8,069,498 B2 | 12/2011 | Maddux |
| 8,087,099 B2 | 1/2012 | Sawabe |
| 8,105,184 B2 | 1/2012 | Lammer |
| 8,117,679 B2 | 2/2012 | Pierce |
| 8,156,569 B2 | 4/2012 | Cripton |
| 8,176,574 B2 | 5/2012 | Bryant |
| 8,201,269 B2 | 6/2012 | Maddux |
| D663,076 S | 7/2012 | Parsons |
| 8,209,784 B2 | 7/2012 | Maddux |
| D666,779 S | 9/2012 | Harris |
| 8,296,867 B2 | 10/2012 | Rudd |
| 8,296,868 B2 | 10/2012 | Belanger |
| D679,058 S | 3/2013 | Szalkowski |
| D681,281 S | 4/2013 | Bologna |
| 8,418,270 B2 | 4/2013 | Desjardins |
| 8,465,376 B2 | 6/2013 | Bentley |
| 8,524,338 B2 | 9/2013 | Anderson |
| 8,544,117 B2 | 10/2013 | Erb |
| 8,544,118 B2 | 10/2013 | Brine, III |
| 8,566,968 B2 | 10/2013 | Marzec |
| 8,572,767 B2 | 11/2013 | Bryant |
| 8,640,267 B1 | 2/2014 | Cohen |
| 8,656,520 B2 | 2/2014 | Rush, III |
| 8,661,564 B2 | 3/2014 | Dodd |
| 8,702,516 B2 | 4/2014 | Bentley |
| 8,707,470 B1 | 4/2014 | Novicky |
| 8,726,424 B2 | 5/2014 | Thomas |
| 8,730,231 B2 | 5/2014 | Snoddy |
| 8,739,317 B2 | 6/2014 | Abernethy |
| 8,756,719 B2 | 6/2014 | Veazie |
| 8,776,272 B1 | 7/2014 | Straus |
| 8,813,269 B2 | 8/2014 | Nelson |
| 8,814,150 B2 | 8/2014 | Ferrara |
| 8,850,622 B2 | 10/2014 | Finiel |
| 8,850,623 B1 | 10/2014 | Mazzoccoli |
| 8,863,319 B2 | 10/2014 | Knight |
| 8,874,251 B2 | 10/2014 | Thornton |
| 8,887,312 B2 | 11/2014 | Bhatnagar |
| 8,887,318 B2 | 11/2014 | Mazzarolo |
| 8,927,088 B2 | 1/2015 | Faden |
| 8,955,169 B2 | 2/2015 | Weber |
| 8,966,670 B2 | 3/2015 | Cheng |

(56) References Cited

U.S. PATENT DOCUMENTS

| | | |
|---|---|---|
| 8,966,671 B2 | 3/2015 | Rumbaugh |
| 9,017,806 B2 | 4/2015 | Jacobsen |
| 9,026,396 B2 | 5/2015 | Evans |
| 9,032,558 B2 | 5/2015 | Leon |
| 9,095,179 B2 | 8/2015 | Kwan |
| 9,107,466 B2 | 8/2015 | Hoying |
| 9,113,672 B2 | 8/2015 | Witcher |
| 9,119,431 B2 | 9/2015 | Bain |
| 9,131,744 B2 | 9/2015 | Erb |
| 9,179,727 B2 | 11/2015 | Grant |
| 9,185,946 B2 | 11/2015 | Leary |
| 9,194,136 B2 | 11/2015 | Cormier |
| 9,210,961 B2 | 12/2015 | Torres |
| 9,249,853 B2 | 2/2016 | Cormier |
| 9,257,054 B2 | 2/2016 | Coza |
| 9,289,024 B2 * | 3/2016 | Withnall .................. A42B 3/08 |
| 9,314,060 B2 | 4/2016 | Giles |
| 9,314,062 B2 | 4/2016 | Marz |
| 9,314,063 B2 | 4/2016 | Bologna |
| 9,320,311 B2 | 4/2016 | Szalkowski |
| 9,332,800 B2 | 5/2016 | Brown |
| 9,339,073 B2 | 5/2016 | De La Fuente |
| 9,380,823 B2 | 7/2016 | Johnson |
| 9,420,843 B2 | 8/2016 | Cormier |
| 9,440,413 B2 | 9/2016 | Lewis |
| 9,462,842 B2 | 10/2016 | Hoshizaki |
| 9,474,316 B2 | 10/2016 | Berry |
| 9,493,643 B2 | 11/2016 | Li |
| 9,498,014 B2 | 11/2016 | Wingo |
| 9,516,910 B2 | 12/2016 | Szalkowski |
| 9,530,248 B2 | 12/2016 | Zhang |
| 9,545,127 B1 | 1/2017 | Sandifer |
| 9,572,390 B1 | 2/2017 | Simpson |
| 9,572,391 B2 | 2/2017 | Mcinnis |
| 9,572,402 B2 | 2/2017 | Jarvis |
| 9,578,917 B2 | 2/2017 | Cohen |
| 9,603,404 B2 | 3/2017 | Pocatko |
| 9,642,410 B2 | 5/2017 | Grice |
| 9,656,148 B2 | 5/2017 | Bologna |
| 9,713,355 B2 | 7/2017 | Daoust |
| 9,726,249 B2 | 8/2017 | Horstemeyer |
| 9,750,296 B2 | 9/2017 | Knight |
| 9,763,487 B1 | 9/2017 | Brown, Jr. |
| 9,763,488 B2 | 9/2017 | Bologna |
| 9,770,060 B2 | 9/2017 | Infusino |
| 9,788,589 B2 | 10/2017 | Lewis |
| 9,788,600 B2 | 10/2017 | Wawrousek |
| 9,795,177 B1 | 10/2017 | Weaver |
| 9,795,180 B2 | 10/2017 | Lowe |
| 9,801,424 B2 | 10/2017 | Mazzarolo |
| 9,839,251 B2 | 12/2017 | Pannikottu |
| 9,841,075 B2 | 12/2017 | Russo |
| 9,924,756 B2 | 3/2018 | Hyman |
| 9,962,905 B2 | 5/2018 | Duoss |
| 9,968,154 B2 | 5/2018 | Tenenbaum |
| 9,980,530 B2 | 5/2018 | Hassan |
| 10,010,122 B2 | 7/2018 | Kamradt |
| 10,029,633 B2 | 7/2018 | Phipps |
| 10,039,338 B2 | 8/2018 | Kelly |
| 10,085,508 B2 | 10/2018 | Surabhi |
| 10,105,584 B1 | 10/2018 | Whitcomb |
| 10,130,133 B2 | 11/2018 | Leon |
| 10,130,134 B2 | 11/2018 | Blair |
| 10,136,691 B2 | 11/2018 | Degolier |
| 10,136,692 B2 | 11/2018 | Ide |
| 10,143,255 B2 | 12/2018 | Golnaraghi |
| 10,149,511 B2 | 12/2018 | Vito |
| 10,151,565 B2 | 12/2018 | Fonte |
| 10,158,685 B1 | 12/2018 | Hobby |
| 10,159,296 B2 | 12/2018 | Pietrzak |
| 10,165,818 B2 | 1/2019 | Suddaby |
| 10,167,922 B2 | 1/2019 | Mcdonnell |
| 10,178,889 B2 | 1/2019 | Wacter |
| 10,182,135 B2 | 1/2019 | Black |
| 10,183,423 B2 | 1/2019 | Nauman |
| 10,271,603 B2 | 4/2019 | Briggs |
| 10,306,941 B2 | 6/2019 | Durocher |
| 10,306,942 B2 | 6/2019 | Hoshizaki |
| 10,350,477 B2 | 7/2019 | Schneider |
| 10,368,604 B2 | 8/2019 | Linares |
| 10,369,739 B2 | 8/2019 | Cormier |
| 10,455,883 B2 | 10/2019 | Brown |
| 10,569,044 B2 | 2/2020 | Dunn |
| 10,948,898 B1 | 3/2021 | Pietrzak |
| 2001/0032351 A1 | 10/2001 | Nakayama |
| 2001/0039674 A1 | 11/2001 | Shida |
| 2002/0114859 A1 | 8/2002 | Cutler |
| 2002/0116147 A1 | 8/2002 | Vock |
| 2003/0014210 A1 | 1/2003 | Vock |
| 2003/0163287 A1 | 8/2003 | Vock |
| 2004/0045078 A1 | 3/2004 | Puchalski |
| 2004/0117896 A1 | 6/2004 | Madey |
| 2004/0139531 A1 | 7/2004 | Moore |
| 2004/0163228 A1 | 8/2004 | Piorkowski |
| 2004/0181854 A1 | 9/2004 | Primrose |
| 2004/0204904 A1 | 10/2004 | Ebisawa |
| 2004/0240198 A1 | 12/2004 | Laar |
| 2004/0250340 A1 | 12/2004 | Piper |
| 2005/0050617 A1 | 3/2005 | Moore |
| 2005/0241048 A1 | 11/2005 | Cattaneo |
| 2005/0241049 A1 | 11/2005 | Ambuske |
| 2005/0278834 A1 | 12/2005 | Lee |
| 2006/0031978 A1 | 2/2006 | Pierce |
| 2006/0059606 A1 | 3/2006 | Ferrara |
| 2006/0101559 A1 | 5/2006 | Moore |
| 2006/0112477 A1 | 6/2006 | Schneider |
| 2006/0143807 A1 | 7/2006 | Udelhofen |
| 2007/0061106 A1 | 3/2007 | Vock |
| 2007/0094769 A1 | 5/2007 | Lakes |
| 2007/0119538 A1 | 5/2007 | Price |
| 2007/0157370 A1 | 7/2007 | Joubert Des Ouches |
| 2007/0266481 A1 | 11/2007 | Alexander |
| 2008/0052808 A1 | 3/2008 | Leick |
| 2008/0086916 A1 | 4/2008 | Ellis |
| 2008/0155734 A1 | 7/2008 | Yen |
| 2008/0163410 A1 | 7/2008 | Udelhofen |
| 2008/0172774 A1 | 7/2008 | Ytterborn |
| 2008/0250550 A1 | 10/2008 | Bologna |
| 2008/0256686 A1 | 10/2008 | Ferrara |
| 2008/0295228 A1 | 12/2008 | Muskovitz |
| 2009/0038055 A1 | 2/2009 | Ferrara |
| 2009/0044316 A1 | 2/2009 | Udelhofen |
| 2009/0057325 A1 | 3/2009 | Tullio |
| 2009/0106882 A1 | 4/2009 | Nimmons |
| 2009/0222964 A1 | 9/2009 | Wiles |
| 2009/0255036 A1 | 10/2009 | Lim |
| 2009/0260133 A1 | 10/2009 | Del Rosario |
| 2009/0265841 A1 | 10/2009 | Ferrara |
| 2010/0043126 A1 | 2/2010 | Morel |
| 2010/0050323 A1 | 3/2010 | Durocher |
| 2010/0180362 A1 | 7/2010 | Glogowski |
| 2010/0251465 A1 | 10/2010 | Milea |
| 2010/0258988 A1 | 10/2010 | Darnell |
| 2010/0287687 A1 | 11/2010 | Ho |
| 2010/0319110 A1 | 12/2010 | Preston-Powers |
| 2011/0047678 A1 | 3/2011 | Barth |
| 2011/0056004 A1 | 3/2011 | Landi |
| 2011/0107503 A1 | 5/2011 | Morgan |
| 2011/0167542 A1 | 7/2011 | Bayne |
| 2011/0203038 A1 | 8/2011 | Jones |
| 2011/0209272 A1 | 9/2011 | Drake |
| 2011/0215931 A1 | 9/2011 | Callsen |
| 2011/0225706 A1 | 9/2011 | Pye |
| 2011/0229685 A1 | 9/2011 | Lin |
| 2011/0271428 A1 | 11/2011 | Withnall |
| 2012/0036619 A1 | 2/2012 | Ytterborn |
| 2012/0036620 A1 | 2/2012 | Harris |
| 2012/0047634 A1 | 3/2012 | Vaidya |
| 2012/0060251 A1 | 3/2012 | Schimpf |
| 2012/0066820 A1 | 3/2012 | Fresco |
| 2012/0079646 A1 | 4/2012 | Belanger |
| 2012/0096631 A1 | 4/2012 | King |
| 2012/0210498 A1 | 8/2012 | Mack |
| 2012/0297526 A1 | 11/2012 | Leon |

(56) References Cited

U.S. PATENT DOCUMENTS

| | | |
|---|---|---|
| 2012/0317705 A1 | 12/2012 | Lindsay |
| 2013/0007950 A1 | 1/2013 | Arai |
| 2013/0040524 A1 | 2/2013 | Halldin |
| 2013/0031700 A1 | 3/2013 | Wacter |
| 2013/0060168 A1 | 3/2013 | Chu |
| 2013/0061371 A1 | 3/2013 | Phipps |
| 2013/0061375 A1 | 3/2013 | Bologna |
| 2013/0067643 A1 | 3/2013 | Musal |
| 2013/0074248 A1 | 3/2013 | Evans |
| 2013/0122256 A1 | 5/2013 | Kleiven |
| 2013/0180034 A1 | 7/2013 | Preisler |
| 2013/0185837 A1 | 7/2013 | Phipps |
| 2013/0211774 A1 | 8/2013 | Bentley |
| 2013/0212783 A1 | 8/2013 | Bonin |
| 2013/0283503 A1 | 10/2013 | Zilverberg |
| 2013/0283504 A1 | 10/2013 | Harris |
| 2013/0298316 A1 | 11/2013 | Jacob |
| 2013/0340146 A1 | 12/2013 | Dekker |
| 2013/0340147 A1 | 12/2013 | Giles |
| 2014/0000012 A1 | 1/2014 | Mustapha |
| 2014/0007324 A1 | 1/2014 | Svehaug |
| 2014/0013492 A1 | 1/2014 | Bottlang |
| 2014/0020158 A1 | 1/2014 | Parsons |
| 2014/0033402 A1 | 2/2014 | Donnadieu |
| 2014/0035658 A1 | 2/2014 | Osamu |
| 2014/0081601 A1 | 3/2014 | Zhang |
| 2014/0090155 A1 | 4/2014 | Johnston |
| 2014/0196198 A1 | 7/2014 | Cohen |
| 2014/0201889 A1 | 7/2014 | Pietrzak |
| 2014/0208486 A1 | 7/2014 | Krueger |
| 2014/0223641 A1 | 8/2014 | Henderson |
| 2014/0223644 A1 | 8/2014 | Bologna |
| 2014/0259326 A1 | 9/2014 | Carlson |
| 2014/0373257 A1 | 12/2014 | Turner |
| 2015/0055085 A1 | 2/2015 | Fonte |
| 2015/0074875 A1 | 3/2015 | Schimpf |
| 2015/0080766 A1 | 3/2015 | Ji |
| 2015/0081076 A1 | 3/2015 | Fernandes |
| 2015/0121609 A1 | 5/2015 | Cote |
| 2015/0157081 A1 | 6/2015 | Hyman |
| 2015/0157083 A1 | 6/2015 | Lowe |
| 2015/0250250 A1 | 9/2015 | Ellis |
| 2015/0272258 A1 | 10/2015 | Preisler |
| 2016/0053843 A1 | 2/2016 | Subhash |
| 2016/0058092 A1 | 3/2016 | Aldino |
| 2016/0157544 A1 | 6/2016 | Ning |
| 2016/0183619 A1 | 6/2016 | Del Ramo |
| 2016/0198681 A1 | 7/2016 | Fyfe |
| 2016/0255900 A1 | 9/2016 | Browd |
| 2016/0286885 A1 | 10/2016 | Hyman |
| 2016/0302496 A1 | 10/2016 | Ferrara |
| 2017/0065018 A1 | 3/2017 | Lindsay |
| 2017/0300755 A1 | 10/2017 | Bose |
| 2019/0110546 A1 | 4/2019 | Wacter |
| 2019/0166946 A1 | 6/2019 | Vito |

FOREIGN PATENT DOCUMENTS

| | | |
|---|---|---|
| CN | 2870519 | 2/2007 |
| CN | 2896943 | 5/2007 |
| CN | 101204904 | 6/2008 |
| CN | 102972901 | 3/2013 |
| DE | 3222681 | 12/1983 |
| DE | 3603234 | 8/1987 |
| DE | 3632525 | 8/1996 |
| DE | 19745960 | 10/1997 |
| DE | 19707495 | 8/1998 |
| EP | 0315498 | 5/1989 |
| EP | 623292 | 11/1994 |
| EP | 630589 | 12/1994 |
| EP | 770338 | 5/1997 |
| EP | 1199000 | 4/2002 |
| EP | 1219189 A1 | 7/2002 |
| EP | 1388300 | 2/2004 |
| EP | 1538935 A1 | 6/2005 |
| EP | 1627575 A1 | 2/2006 |
| EP | 1708587 A1 | 10/2006 |
| EP | 1836913 A2 | 9/2007 |
| EP | 1972220 | 9/2008 |
| EP | 2042048 A2 | 4/2009 |
| EP | 2071969 A2 | 6/2009 |
| EP | 2103229 A2 | 9/2009 |
| EP | 2156761 A2 | 2/2010 |
| EP | 2289360 A2 | 3/2011 |
| EP | 2389822 A | 11/2011 |
| EP | 2428129 A2 | 3/2012 |
| EP | 2525187 | 11/2012 |
| GB | 256430 | 8/1926 |
| GB | 2481855 A | 1/2012 |
| GB | 2490894 | 11/2012 |
| JP | 2000045119 | 2/2000 |
| JP | 2000245888 | 9/2000 |
| JP | 2001020121 | 1/2001 |
| RU | 2150874 | 6/2000 |
| RU | 2005129896 | 4/2007 |
| RU | 2308763 | 10/2007 |
| WO | 9534229 | 12/1995 |
| WO | 1998023174 | 6/1998 |
| WO | 9911152 | 3/1999 |
| WO | 1999042012 | 8/1999 |
| WO | 2000067998 | 11/2000 |
| WO | 2002028211 | 4/2002 |
| WO | 2004023913 | 3/2004 |
| WO | 2004052133 | 6/2004 |
| WO | 2005060392 | 7/2005 |
| WO | 2007013106 | 2/2007 |
| WO | 2007047923 | 4/2007 |
| WO | 2008085108 A1 | 7/2008 |
| WO | 2010001230 | 1/2010 |
| WO | 2011084660 | 7/2011 |
| WO | 2011087435 A1 | 7/2011 |
| WO | 2011148146 | 12/2011 |
| WO | 2012047696 | 4/2012 |
| WO | 2012074400 | 6/2012 |
| WO | 2012099633 | 7/2012 |
| WO | 2013033078 A1 | 3/2013 |
| WO | 17171694 | 10/2017 |
| WO | 2018072017 | 4/2018 |

OTHER PUBLICATIONS

International Search Report and Written Opinion issued in PCT/US14/11877 dated Apr. 24, 2014 (12 pages).
International Search Report for PCT/US2005/032903 dated Mar. 10, 2006.
International Search Report for PCT/US2006/000536 dated Oct. 2, 2006.
Written Opinion for PCT/US2006/000536 dated Jul. 10, 2007.
International Search Report and Written Opinion issued in PCT/US2017/043132 dated Sep. 28, 2017 (10 pages).
International Search Report and Written Opinion issued in PCT/US2019/066084 dated Mar. 9, 2020 (13 pages).
International Search Report and Written Opinion issued in PCT/US2019/062700 dated Jan. 30, 2020 (17 pages).
International Search Report and Written Opinion issued in PCT/US2019/062697 dated Feb. 3, 2020 (18 pages).
International Search Report and Written Opinion issued in PCT/US2019/046935 dated Dec. 23, 2019 (17 pages).
Walmink et al., Interaction opportunities around helmet design, 4 pages (Year: 2014).
Yu et al., Motorcycle helmet safety design research, 5 pages (Year: 2010).

* cited by examiner

SYSTEM AND METHOD FOR FORMING A PROTECTIVE HELMET FOR A CUSTOMER'S HEAD

RELATED APPLICATIONS

This application is a continuation of U.S. utility patent application Ser. No. 17/201,813, filed Mar. 15, 2021, which is a continuation of U.S. utility patent application Ser. No. 17/026,475, filed Sep. 21, 2020, which is a continuation of U.S. utility patent application Ser. No. 16/231,805, filed Dec. 24, 2018, which is a continuation of U.S. utility patent application Ser. No. 14/156,269, filed Jan. 15, 2014, which claims the benefit from U.S. provisional patent application 61/754,469, filed Jan. 18, 2013, U.S. provisional patent application 61/812,666, filed Apr. 16, 2013, U.S. provisional patent application 61/875,603, filed Sep. 9, 2013, U.S. provisional patent application 61/883,087, filed Sep. 26, 2013, the disclosure of which are incorporated herein by this reference.

TECHNICAL FIELD

This disclosure relates to a system and method for forming a protective helmet for a customer's head, such as a helmet for a cyclist, football player, hockey player, or motor sports participant. In particular, the system and method include equipment and methods for capturing and receiving captured data from customers or potential customers and arranging the data for three-dimensional analysis.

BACKGROUND

For helmet-wearing athletes in many sports, beyond the safety aspects of the protective helmet, additional considerations can include helmet fit and airflow through the helmet. Improvements in fit comfort and airflow can reduce distractions to the athlete and thereby improve performance. Although the results of the method and system disclosed in this document relate primarily to safety, in addition to safety, improvements in fit, airflow, and comfort can also be achieved without reducing safety for particular customers and customer head shapes.

Conventional helmet creation technology has designed helmets with the assumption that human heads are similar and that head circumference is the most important factor in choosing an appropriate helmet. Adjustments to the standard helmet are then made by adding different thicknesses of padding between the customer's head and the inner surface of the helmet. These assumptions, however, have resulted in helmets that do not fit correctly, tend to slip around on the customer's head, rattle on the customer's head when vibration occurs in the customer's body during activities in the sport, or to create pressure points on the customer's head and face to try to keep the helmet in place even though the padding does not fit right or where the customer's head is too big to have padding between the head and the helmet protective material. Systems that conform to a customer's head developed by Giro and Bell in the 1990's do a remarkable job of stabilizing the helmet on a customer's head. However, previously developed fit systems do not totally eliminate reliance on the requirement for additional padding by the customer to adapt the standard helmets to the customer's head for a more comfortable fit.

While scanning systems for human body parts are known, they suffer from a number of significant limitations and deficiencies. For example, the scanning equipment is expensive, bulky and requires the scanner and the subject to be in the same place at the same time. This requirement limits the easy and cost effective access for the general public as the scanner equipment is very expensive, difficult to transport and must have trained personnel to use it. Additionally, some head shape scanning technologies are susceptible to false readings due to moisture on the head and hair bulk. Conventional helmet creating technologies are not practical for creating custom head shape helmets because they are expensive and the molds are expensive. It is desirable to form a custom fit helmet for customers without the need of expensive scanning and manufacturing equipment, and to create that custom fit helmet quickly and without requiring separate custom molds for each helmet.

SUMMARY

A need exists for a custom-fitted helmet and a method for making the same. Accordingly, in an aspect, a method of making a custom-fitted helmet can comprise, at a first location, obtaining head data for a customer's head comprising a length, a width, and at least one head contour. Generating, with at least one processor, a computerized three dimensional (3D) headform matching the customer's head length, width, and head contour from the head data. Comparing the 3D headform to a helmet safety standard. At a second location different from the first location, forming a custom-fitted helmet based on the 3D headform wherein the custom-fitted helmet satisfies the safety standard and comprises an inner surface comprising a topography that conforms to the length, width, and at least one contour of the customer's head.

The method of making the custom-fitted helmet can further comprise obtaining head data for the customer's head by obtaining images of a deformable interface member disposed on the customer's head, wherein a thickness of the deformable interface member approximates a thickness of a padding layer disposed within the custom-fitted helmet. Obtaining the images can be accomplished by using an optical sensor, a camera, or a laser. Obtaining images of the deformable interface member that can comprise measurement points. Obtaining images that can comprise a marker of a known size. Obtaining the head data can comprise gathering the head data using a non-contact sensor positioned adjacent the customer's head. Updating a customer's head data can occur after at least six months by measuring at least the customer's updated head length and updated head width. Obtaining the head data at the first location by capturing a photographic image of the customer's head can include the first location being a customer's home, and sending the captured photographic image of the customer's head from the customer's home to the at least one processor located a location remote from the customer's home. Obtaining the head data at the first location can be accomplished by capturing a photographic image of the customer's head, wherein the first location is a store, and sending the captured photographic image of the customer's head from the store to the at least one processor located a location remote from the store. The inner surface of the custom-fitted helmet can be formed comprising a surface topography that is proportional to the length, width, and at least one contour of the customer's head. A graphical computerized 3D headform can be generated from the head data, the helmet safety standard can be provided as a graphical 3D helmet safety standard, and the 3D headform can be compared to the helmet safety standard by positioning the graphical 3D headform within the graphical 3D helmet safety standard to determine a size and shape of the inner surface of the custom-fitted helmet. The helmet safety standard can be provided comprising a certified surface. The helmet safety standard can be provided comprising a test line. A helmet base unit can be selected comprising a surface comprising a size and shape different than a size and shape of the inner surface of the custom-fitted helmet and the inner surface of the custom-fitted helmet can be formed by removing expanded polystyrene (EPS) from the helmet base unit using a computer numerical control (CNC) machine. The inner surface of the custom-fitted helmet can be formed by an additive process. Forming the inner surface of the custom-fitted helmet can be accomplished by inserting a liner comprising a plurality of contiguous pieces or a plurality of separated pieces into a helmet base unit. The liner can be formed as a substantially flat array of pieces and a surface of the substantially flat array of pieces can be adjusted to mirror the computerized headform.

In another aspect, a method of making a custom-fitted helmet can comprise obtaining head data for a customer's head, comparing the head data to a helmet safety standard, and forming a custom-fitted helmet that satisfies the safety standard and comprises an inner surface comprising a topography that conforms to the head data for the customer's head.

The method of making the custom-fitted helmet can further comprise obtaining head data for the customer's head length, width, and at least one head contour. A graphical computerized 3D headform can be generated from the head data, the helmet safety standard can be provided as a graphical 3D helmet safety standard, and the 3D headform can be compared to the helmet safety standard by positioning the graphical 3D headform within the helmet safety standard to determine a size and shape of the inner surface of the custom-fitted helmet. The helmet safety standard can be a graphical 3D helmet safety standard comprising a certified surface. The graphical 3D helmet safety standard can comprise a test line. A helmet base unit can be selected to comprise a surface comprising a size and shape different than a size and shape of the inner surface of the custom-fitted helmet, and the inner surface of the custom-fitted helmet can be formed by removing EPS from the helmet base unit using a CNC machine. The helmet base unit can be formed comprising a first protective material and a second protective material disposed adjacent to the first protective material, wherein the second protective material is more easily removed that the first protective material, and the custom-fitted helmet can be formed by removing a portion of the second protective material. The custom-fitted helmet can be formed comprising posts configured to interface with a jig to stabilize the custom-fitted helmet during forming. The inner surface of the custom-fitted helmet can be formed by an additive process. The inner surface of the custom-fitted helmet can be formed by inserting a custom-fitted liner into a stock helmet. Head data for the customer's head can be obtained by obtaining images of a deformable interface member disposed on the customer's head, wherein a thickness of the deformable interface layer corresponds to a thickness of a padding layer within the custom-fitted helmet.

In another aspect, a method of making a custom-fitted helmet can comprise, at a home or at a store, obtaining head data for a customer's head, and at a location remote from the home or retail store, forming a custom-fitted helmet that comprises an inner surface comprising a topography that conforms to the head data for the customer's head.

The method of making the custom-fitted helmet can further comprise obtaining head data for the customer's head by obtaining images of a deformable interface member disposed on the customer's head, wherein the images comprise a marker of a known size. A graphical computerized 3D headform can be generated from the head data, a helmet safety standard can be provided as a graphical 3D helmet safety standard, and the 3D headform can be compared to the graphical 3D helmet safety standard by positioning the graphical 3D headform within the graphical 3D helmet safety standard to determine a size and shape of the inner surface of the custom-fitted helmet. The graphical 3D helmet safety standard can comprise a certified surface. The graphical 3D helmet safety standard can further comprises a test line. Head data can be obtained by obtaining a length and a width of the customer's head based on two-dimensional (2D) measurements. A helmet base unit can be selected to comprise a surface comprising a size and shape different than a size and shape of the inner surface of the custom-fitted helmet, and the inner surface of the custom-fitted helmet can be formed by removing EPS from the helmet base unit using a CNC machine. The graphical 3D headform can be positioned within the graphical 3D helmet safety standard to optimize a field of view (FOV) for the customer.

DETAILED DESCRIPTION

Figure 1:
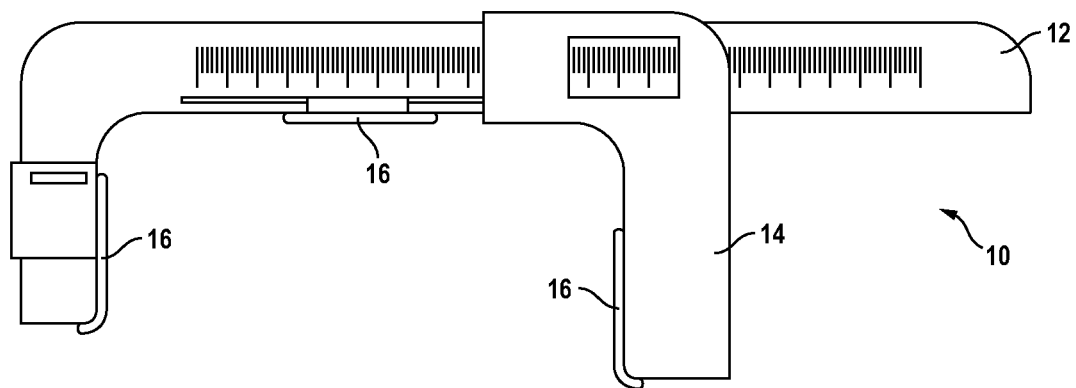
FIG. 1 shows a mechanical measurement tool.

This disclosure, its aspects and implementations, are not limited to the specific helmet or material types, or other system component examples, or methods disclosed herein. Many additional components, manufacturing and assembly procedures known in the art consistent with helmet manufacture are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

This disclosure provides a system and method for custom forming a protective helmet for a customer's head, such as a helmet for a cyclist, football player, hockey player, baseball player, lacrosse player, polo player, equestrian rider, rock climber, auto racer, motorcycle rider, motocross racer, skier, skater, ice skater, snowboarder, snow skier and other snow or water athlete, sky diver or any other athlete in a sport or other person including soldier, pilot, or other military person, who is in need of protective head gear. Each of these sports uses a helmet that includes either single or multi-impact rated protective material base that is typically, though not always, covered on the outside by a decorative cover and includes comfort material on at least portions of the inside, usually in the form of padding. Other sports, such as boxing sparring, wrestling and water polo use soft helmet types. Soft helmet types can also benefit from particular aspects of the disclosed methods and system through custom fit soft helmets. Other industries also use protective headwear, such as a construction, soldier, fire fighter, pilot, or other worker in need of a safety helmet, where similar technologies and methods may also be applied. The method, system, and devices described herein are discussed with particular reference to heads and custom-fitted helmets, the same or similar methods, systems, and devices are applicable to other body parts and corresponding gear or clothing.

Human heads are each very different. Even if two people have the same head circumference, they may have different relative length and width measurements, and certainly have different head topographies. Conventional helmet sizes, small, medium, large, extra large, etc., are generally based on head circumference. If a customer's head circumference is a particular circumference, the customer may try a particular generic helmet size that does not fit because the customer's head is longer or wider than "normal," and is different from the generic helmet size, such that the customer may try wearing the next larger generic helmet size. However, the customer's head may have had a head shape that includes a width that is substantially equal to a first or generic small width, while the customer's head further includes a length that is substantially equal to a second or generic medium length. In a such a situation, putting the customer into a medium sized helmet results in the helmet not fitting as well as it could because the helmet width is now too big and must be filled by extra padding. By studying many different head shapes and the fit of helmets to those respective head shapes, it has been discovered that head length and width are the most important measurements on a head in determining a comfortable fit and providing a good match between a customer's head topography and a topography of the helmet. It has also been discovered that matching a length and width of a customer's head to a length and width of the customer's helmet is more important than only matching a circumference of the customer's head to a circumference of the customer's helmet. Additionally, matching a topography of the customer's head to a topography of the customer's helmet also plays a significant role in determining a good fit for comfort and safety. As additional data on more and more head shapes and topography continues to be gathered and studied, additional classifications of head shapes may be discovered to further refine the processes described herein.

Accordingly, this disclosure relates to a system for manufacturing a customer specific custom-fitted helmet that matches a customer's particular head size and topography to a helmet that is created specifically for that customer. The system may be implemented through a computer interface or other method that receives the customer's head data and then manufactures a custom-fitted helmet unique to that customer's head data. As an overview, a particular non-limiting embodiment comprises receiving captured customer head data, analyzing the received data for comparison with safety standards, a pre-determined thickness or other standards, creating an acceptable 3D model for at least portions of the helmet internal surface, and creating a custom helmet specific to the customer's data received.

A protective helmet customer's head data may be gathered in a variety of different levels of detail and manners. Particular embodiments of the systems and methods disclosed are improved and more useful with more data received, but the systems and methods are not limited to capturing the full level of detail in every instance. For example, although capturing a full 3D model and topographical layout of a customer's head may be accomplished using, for example, a non-contact or optical sensor such as a laser, an optical micrometer, photographic camera, or video recorder, in many cases just the customer's head length and head width measurements may be used to create a custom helmet for the customer through embodiments of the system and method. It is intended that although particular more complete levels of data capture are described herein, any of the embodiments may be implemented with any level of data capture detail by either substituting in standard data for any missing data, or by comparison with other similar head shapes to customize to the most likely head topography for the customer from other customer data with acceptable margins.

Customer head data may be captured with the customer present through the use of mechanical measurement tools such as a ruler, tape measure, or calipers, or through optical tools such as a 2D photo or series of photos or video that can later be broken down by frames to extract the data, through physical casting of the customer's head, through laser micrometers, touch probes, magnetic resonance imaging, CT scanning, radio wave scanning, micrometer scanning of the customer's head or portions of the customer's head, and any other method known for gathering measurement data relating to the outer surface of the customer's head. Those of ordinary skill in the art will readily understand how to extract the data into a usable form from the particular data gathering method chosen. FIG. 1 shows an exemplary two-dimensional head measurement tool 10 that includes a ruler 12, a slidable member 14, and pads 16, configured to be disposed against a customer's head or in contact with another body part or object to be measured. By adjusting slidable member 14 until pads 16 are touching, or adjacent to, opposing portions of a customer's head or other body part, an accurate 2D distance can be obtained.

Figure 2A:
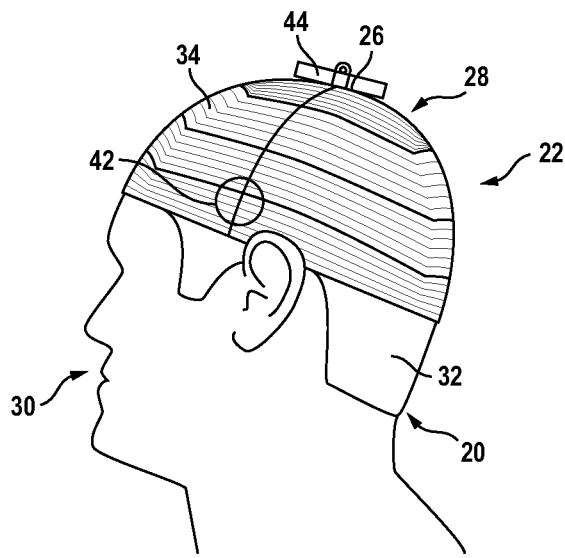
FIGS. 2A-2C show an embodiment of a customer wearing a deformable interface member.
Figure 2B:
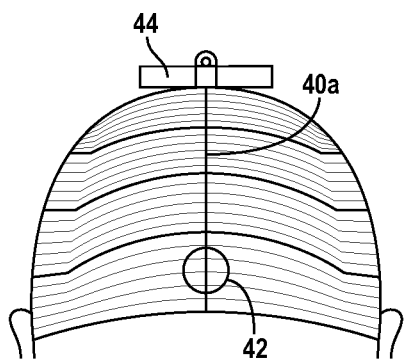
Figure 2C:
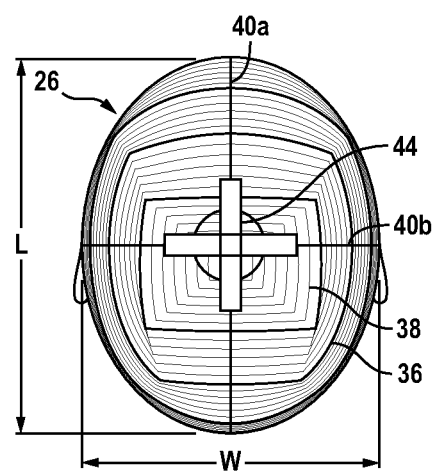

FIGS. 2A-2C show a particular, non-limiting example of how biometric data of a customer 20 may be captured and received from a customer wearing a deformable interface member 22 for a custom fit helmet. Deformable interface member 22 comprises a flexible sleeve or tube that can be made of a thin, resilient, radially stretchable material designed to conform and contour to at least a portion of customer 20. Deformable interface member 22 can comprise a loose-knit fiber breathably configured to allow airflow during use. Providing breathable configurations of deformable interface member 22 can be of particular benefit when the deformable interface member is disposed over a face of customer head 30. Deformable interface member 22 can be formed of a fiber or loose-knit fiber or material that can be any one of a number of stretchable or elastic materials, including NYLON, LYCRA, SPANDEX, BIOSKIN, EpX, or other suitable commercially available material.

FIG. 2A shows customer 20 wearing a deformable interface member 22 that is configured as a tight fitting cap or head piece 26 disposed over a portion of customer head 30. Cap 26 can be disposed over the customer's crown and a top portion of customer head 30 without covering an entirety of customer head 30 including the face of customer 20. The portion of customer head 30 covered by cap 26 can correspond to a portion of customer head 30 that will be covered by the customer's custom-fitted helmet. In some instances, a size of the portion of customer head 30 covered by the deformable interface member 22 will be equal to or greater than a size of a portion of customer head 30 that will be covered by the customer's custom-fitted helmet.

For the measurement of most heads, by wearing a deformable interface member 22, at least a portion of the customer's hair 32 can be pressed flat against customer head 30. Because most customers have some hair, and at a minimum the deformable interface member 22 has a thickness, even when deformable interface member 22, such as cap 26 is designed to fit tightly on customer head 30, a gap or offset will exist between a surface of customer head 30 (such as the scalp) and an outer surface 34 of deformable interface member 22. In most if not all cases, margins of error for the gap between the surface of customer head 30 and the outer surface 34 of deformable interface member 22 is small enough to not be critical to the processes for creation of a custom helmet. More specifically, a thickness of the customer hair 32 under the deformable interface material is often a good approximation of a thickness of customer hair 32 that will be accommodated between customer head 30 and an inner surface of the customer's customized helmet. Alternatively, a known or approximate thickness of the deformable interface member 22, a thickness of the customer's hair 32, or both can be subtracted from a measurement of the outer surface of deformable interface material 22 to produce a better approximation of an actual measurement of customer head 30.

In an embodiment, a thickness of deformable interface material 22 can be selected to be equal to a thickness of subsequently added comfort padding. Thus, deformable interface material 22 can provide a desired offset for subsequently included comfort padding, such as padding of interface layer 84, without a need for performing costly post-measurement or post-processing computer aided drafting (CAD) work. By directly measuring a good and viable approximation for a surface 85 of padding 84, an amount of expensive CAD work needed for generating a custom inner surface 82 of a custom-fitted helmet 81 is reduced, thereby providing a streamlined and cost-effective process for modeling and generating custom-fitted helmets 81. Accordingly, any gap between the scalp of a customer head 30, including customer hair 32 and a thickness of deformable interface member 22, can be accounted for in a variety of ways according to the application and design of the modeling process. For convenience of discussion, the present disclosure will at times refer to the head data gathered from an outer surface of deformable interface material 22 as the customer's head data relevant to the surface of the customer head 30, and not as an approximation. However, the measurement of customer head 30 can also include an offset for padding 84.

In a particular embodiment, cap 26 used for the initial measurements of customer head 30 comprises a thickness of approximately 1.5 mm (made of neoprene in particular embodiments). It has been found that for some wearers, like track racers, a tighter fit is more desirable than for other wearers, like street riders, who are used to a looser fit on their head. In particular embodiments described below, the surface of the 3D headform 66 is used as the cutting surface for the customization process for the inner surface of the base unit. In other embodiments, additional calculations are made to virtually add a layer between the wearer's head and the cut surface before the cut surface is defined and the cuts are made. By having the wearer wear a cap that includes a predetermined thickness that is chosen to allow a particular offset between the wearer's head and the internal surface of the final custom helmet, the additional calculations are not needed. This reduces processing time and significantly simplifies the cutting surface calculations.

In one particular embodiment, three different cap thicknesses are used as options for a wearer depending upon the wearer's preferences and the ultimate purpose for the helmet created. In a particular embodiment, a first cap thickness is 1.5 mm, a second cap thickness is 3.0 mm and a third cap thickness is 4.5 mm. These examples are non-limiting and user preferences are different and uses for the helmets are different so that any range of cap thicknesses and any number of caps is contemplated for use with various embodiments. In another particular embodiment, instead of, or in addition to, separate caps being used, a wearer may apply multiple caps simultaneously to obtain a thicker offset. For example, a wearer may apply three 1.5 mm caps to obtain a cap thickness of 4.5 mm. Thus, a wearer may indicate a preference as to how tight they want their final helmet to fit and without requiring additional complex calculations the system can automatically adapt the final cut line helmet model to compare with the headform by simply applying a particular thickness of cap or multiple caps of the same or different thicknesses during data capture.

In other particular embodiments, the cap thickness may be selected to automatically establish a padding offset or the padding offset combined with a comfort offset, without the system further calculating a 3D offset from the wearer's measured head data. By incorporating the offset into the cap thickness, the offset that ordinarily would have been calculated by the computer system may be automatically accounted for through a thicker cap. Provided the cap material fits closely to the wearer's head, like neoprene or nylon or another elastic and flexible, form fitting material, this method may be used to establish the desired offset without further calculating of a separate cutting surface.

As shown in FIGS. 2A-2C, cap 26 includes a reference or grid pattern 28 comprising horizontal and vertical lines. However, reference pattern 28 can comprise vertical lines, skewed lines, intersecting lines, bars, squares, circles, diamonds, hatching, or any geometric pattern, organic pattern, stochastic pattern, or any other design of suitable shapes, colors, patterns, or forms. As illustrated in FIGS. 2A-2C, the horizontal lines may be further configured as major horizontal reference lines 36 and minor horizontal reference lines 38 separated by known distances. For example, FIG. 2A is a side view of customer head 30 wearing cap 26 that includes, in an embodiment, three major horizontal reference lines 36 formed around circumferences of differing sizes along interface member 22. FIG. 2A additionally shows a plurality of minor horizontal reference lines 38 spaced at known or even intervals that can be spaced at a fixed distance between each of the major reference lines 36. In an embodiment, as illustrated in FIG. 2A, 5 minor reference lines 38 are disposed between each adjacent pair of major reference lines 36, although any number of reference lines can be used. In addition, interface member 22 can also include vertical reference lines 40 that are perpendicular or normal to the horizontal reference lines. As shown in FIG. 2C, a top view of cap 26 is shown in which interface member 22 includes a first vertical reference line 40a extending between front and back portions of customer head 30 in a direction of a length L of the customer head. Similarly, interface member 22 is also shown including a second vertical reference line 40b extending between opposing sides of customer head 30 in a direction of a width W of the customer head, in which the vertical reference line 40a intersects vertical reference line 40b at a perpendicular angle, or an angle of approximately 90 degrees. Therefore, reference lines 36, 38, and 40 form an exemplary reference pattern 28 that can show a shape, contour, or topography of customer head 30, and can be used in collecting data for the customer head, including length, width, and at least one contour of the customer head. For example, vertical line 40a can follow and delineate a contour of customer head 30 along a peak or ridge of the customer head along its length. Similarly, vertical reference line 40b can follow and delineate a contour of customer head 30 along a peak or ridge of the customer head along its width. Additionally, a plurality of other contour lines can also be captured by any number of different reference patterns 20.

As shown in FIGS. 2A and 2B, cap 26 can also include measurement points 42. Deformable interface member 22 can include any number of measurement points, and in an embodiment, includes at least four measurement points 42 located on a left side, right side, front and rear portion of deformable interface member 22 and in-line or overlapping with vertical reference lines 40a and 40b. Deformable interface member 22 can further include an orientation device 44 that may be located at an uppermost extent of deformable interface member 22 or at an intersection of vertical reference lines 40. Orientation device 44 helps facilitate imaging of deformable interface member 22, such as by photographs, and can further facilitate subsequent compilation or assimilation of the images to provide a comprehensive data set or headform of customer head 30, as discussed in greater detail below. Orientation device 44 can be sized and shaped in any suitable configuration and material. For example, orientation device 44 can be configured as one or more plastic tubes formed into any shape to provide relative orientation between deformable interface member 22 and customer head 30.

Thus, a non-limiting example of a particular method for obtaining head data can be understood with respect to FIGS. 2A-2C. First, customer 20 wears cap 26 on customer head 30. Next, an initial set of reference measurements are taken of measurement points 42 while customer 20 is wearing an interface member 22 such as cap 26. For example, measurements can be taken along vertical reference lines 40a and 40b from the front, rear, left, right, and top sides of deformable interface member 22. The method can further include orientation device 44 aligned with deformable interface member 22 when measuring the deformable interface member. The measurement of deformable interface member 22 can be done directly with the interface member, such as by using head measurement tool 10, or other suitable 2D or 3D measurement tool, or by taking a plurality of photographs of the interface member while worn on customer head 30. Photographs can be taken of left, right, front, rear, and top views of the customer's head, including measurement points 42 and orientation device 44. Measurements can also be made of customer head 30 by collecting data from the photographs or from a 3D headform or model that is constructed from the customer head data. Because cap 26 can include major horizontal reference lines 36, minor horizontal reference lines 38, vertical reference lines 40, measurement points 42, and orientation device 44, more data can be gathered during imaging for determining a more complete model of the topography of customer head 30.

Figure 3A:
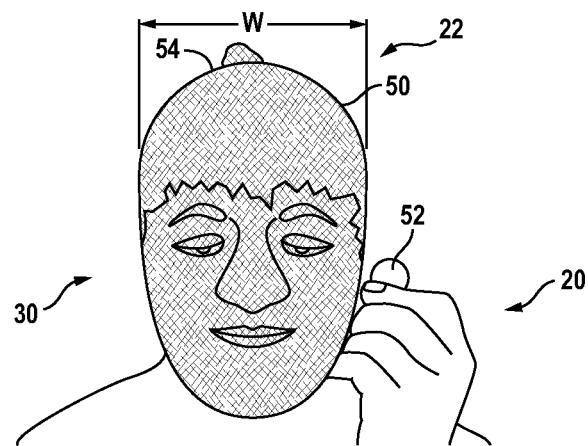
FIGS. 3A-3B show another embodiment of a customer wearing a deformable interface member.
Figure 3B:
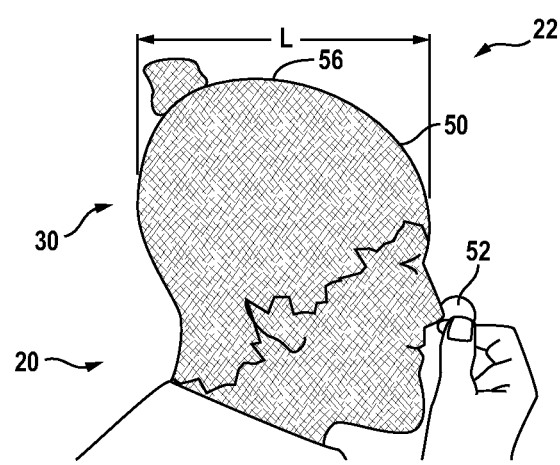

FIGS. 3A and 3B show another variation of a method for obtaining consumer head data for customer 20 wearing a deformable interface layer 22. More specifically, FIG. 3A shows a front view of customer 20 wearing a deformable interface member 22 configured as a tight form fitting headpiece or mask 50 disposed over an entirety of customer head 30 and the customer's face, which facilitates obtaining head data for an entirety of the customer head 30. Obtaining head data for an entirety of customer head 30 can be obtained, as described above, by use of one or more mechanical measurement tools, optical tools, or both. As a non-limiting example, head data can be obtained for customer head 30 while wearing headpiece 50 by capturing photos of customer head 30. Photographs or images of headpiece 50 can be obtained for multiple views and from multiple angles relative to customer head 30. A greater number of photos can capture a greater amount of detail of customer head 30 such that a better custom fit for a custom-fitted helmet can be possible. In an embodiment, five images or photographs are taken of a customer's head 30 wearing deformable interface member 22, the five images including a front view, a back view, a left view, a right view, and a top view.

As shown in FIG. 3A, a width (W) of customer head 30 can be measured by taking a distance from opposing outer edges of customer head 30 in the coronal plane. As shown in FIG. 3B, a length (L) of customer head 30 can be measured by taking a distance from opposing outer edges of customer head 30 in the sagittal plane. Thus, a length L and width W of customer head 30, as well as a general shape of customer head 30, can be obtained by imaging customer head 30. Additionally, contours of customer head 30 can also be obtained. Exemplary contours can include a first contour 54 that includes a crest or ridgeline along a peripheral edge of customer head 30 as seen in FIG. 3A or a second contour 56 that includes a crest or ridgeline along a peripheral edge of customer head 30 as seen in FIG. 3B. A plurality of other contours can also be obtained for different crests and ridgelines along a peripheral edge of images or photographs taken at different relative angles with respect to customer 20. A greater number of contours can provide a greater amount of detail of the shape and topography of customer head 30 such that a better custom fit for a custom-fitted helmet can be possible.

As shown in the front view of FIG. 3A and the side view of FIG. 3B, headpiece 50 does not include a reference or grid pattern such as the reference pattern 28 shown in FIGS. 2A-2C. Instead a marker or reference item 52 is used to indicate relative size of customer head 30 and facilitate scaling of dimensions from the captured images or scans. As such, marker 52 comprises known dimensions, and can include a fixed feature positioned adjacent to the customer when the customer wearing headpiece 50 is imaged or the head data is obtained. Marker 52 also comprises movable items that can be held or positioned by customer 20 for imaging. For example, FIG. 3A shows customer 20 holding a coin as marker 52 to provide a relative distance or scale for measuring or calibrating the head data obtained from imaging headpiece 50. Thus, by including marker 52 within a photograph of customer 20 wearing headpiece 50 taken at a first location, the relative dimensions of head 30 can be analyzed at a time after the photo is taken, and at a second location that is different or remote from the first location.

For example, the first location can be at a home or residence, such as the customer's home, where customer head data collection can be obtained, for example, through imaging, measuring, or photographing in the convenience of the home of customer 20. Additionally, the first location can also include a store, kiosk, tradeshow, or other event or location at which images or data of customer head 30 can be captured. When capturing head data at the first location, customer 20 or another individual assisting the customer can take or capture one or more photographs with a discrete or stand alone camera. Alternatively, one or more photographs can be captured by a camera that is integrated with a computer, tablet, or handheld electronic device. The integrated camera can also be associated or paired with an application or software program that includes instructions or directions that guide or prompt customer 20 or other user or helper through a process of obtaining or acquiring the appropriate images of photographs. Interactive applications and software can also adaptively adjust a number and type of images taken in order to ensure adequate and proper data for subsequent helmet customization. For example, a stationary camera coupled to a computer program can take a series of photos at one or more fixed time intervals. The interactive program can also prompt the customer to position customer head 30 at useful positions for each image captured, such that the customer is directed to change their head position relative to the camera during each time interval to provide multiple pictures at different angles, such as pictures of a front, side, and back of customer head 30. Based on the quality of data received, the tolerance or sizing required for a final custom-fitted helmet, the interactive software can prompt customer 20 or an assistant to take additional photographs or retake low quality and out-of-focus or misaligned photographs to ensure sufficient and proper head data is obtained to make the custom-fitted helmet. The interactive application can also be configured to enable the customer to select other customizations for the custom-fitted helmet.

The head data obtained for customer 20 need not be restricted to a single use or customized-fitted helmet. Instead, the data gathered for customer 20 can be entered into database 24 and used to establish a customer profile for later processing, analysis, and manufacture. Because, after a particular age, a shape and size of customer head 30 will not change significantly, the customer's profile may be saved for some time and used for future custom helmet orders. Updating head data for customer head 30 can occur at regular or fixed intervals based on the customer's age, the customer's anticipated growth, or in conjunction with athletic seasons and schedules. For example, a customer's head data can be updated at least every year, or at least every six months by measuring at least one or more of the customer's updated head length, updated head width, or updated head contour.

Thus, customer head data, once captured, and before or after refinement of the data, can be sent from the first location to a second location remote from the first location. The customer head data may be transmitted to database 24 in which head data is centralized for further processing, analysis, and manufacture of a custom helmet, as discussed in greater detail below. The data may be transferred in any way to database 24 such as, but not limited to, entry into and transmission through a computer over the Internet or other transmission method, mailing the data records, or a store employee, customer assistant or even the customer calling someone associated with database 24 and relaying the data.

Figure 4A:
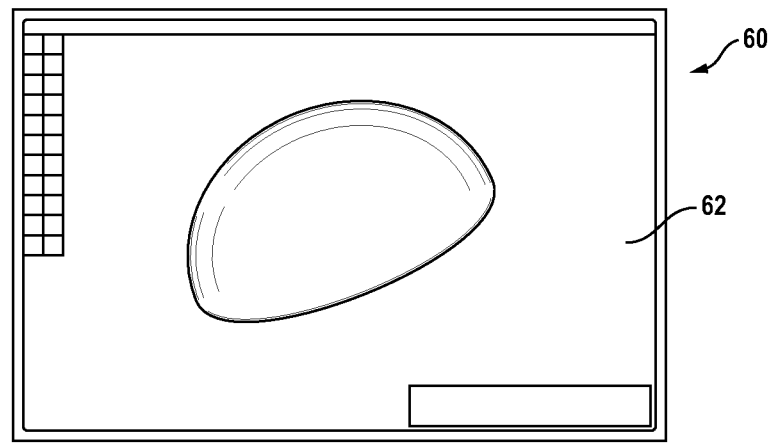
FIGS. 4A-4C show a 3D headform generated by modeling software.
Figure 4B:
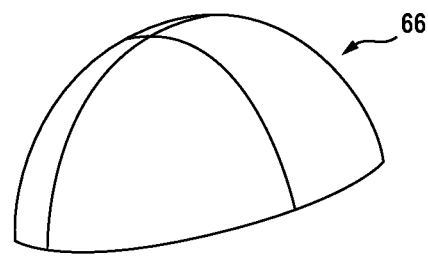
Figure 4C:
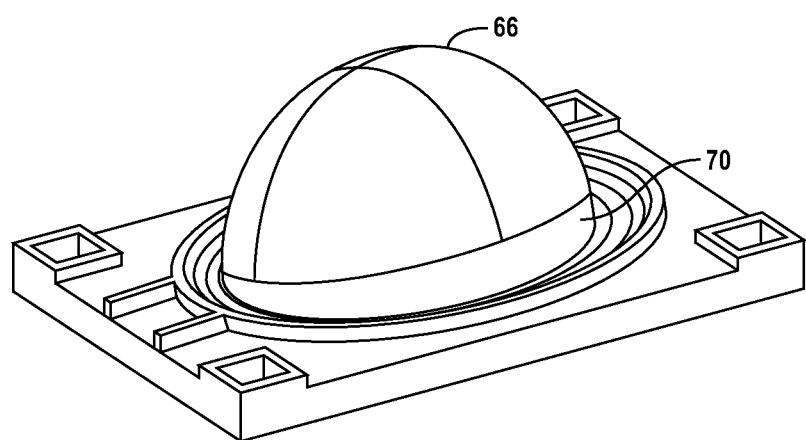

FIGS. 4A-4C show that after obtaining head data for customer 20, the head data can be used to generate a computerized 3D headform matching a length, width, and head contour of customer head 30 using at least one processor and a 3D modeling program 60. Before the computerized 3D headform is generated, the customer's head data can be further processed, if needed, and analyzed for the specific measurement data relevant to customer head 30. For embodiments where customer head data is captured as images, commercially available image analysis software can be used as 3D modeling program 60 to create an approximate 3D image or at least a 3D array of reference points for use in approximating the surface of customer head 30. FIG. 4A shows a non-limiting example of commercially available image analysis software 62, 123D Catch, which is produced by Autodesk, and can be used as a program for 3D modeling. Whether the surface data is modeled as a 3D solid, a 3D surface, a point cloud, a data array, a polygonal mesh, or any other surface model approximation method, the data may be used to approximate the surface of customer head 30 for purposes of this disclosure.

In an embodiment, head data for customer 20, such as photographs, can be imported into image analysis software 62 such that photographs of the customer are placed on corresponding reference planes, such as coronal, sagittal, and transverse planes, and are dimensioned based on the measurements taken, such as the measurements from the measurement points 42 or from marker 52. 3D modeling program 60 generates a representation of customer head 30 and can include a 3D pattern that matches reference pattern 28, if present. Accordingly, 3D lines can match major and minor horizontal reference lines 40a and 40b, respectively, as well as vertical reference lines 40, if present, to each of the corresponding reference planes. Using the 3D curves, the modeling program creates a surface that connects all of the curves to form a 3D headform or graphical representation 66 of the customer's head 30, as shown in FIG. 4B. 3D headform 66 closely corresponds to a topography or the length, width, and at least one contour of customer head 30. Notably, 3D headform 66 can be offset by a predetermined amount to accommodate the thickness of the helmet's internal liner and/or internal padding assembly.

FIG. 4B shows a 3D headform 66 for an upper or top portion of customer head 30 for forming a custom-fitted helmet that only covers the top portion of customer head 30. Alternatively, headform 66 can be for an entirety of customer head 30, including the face, chin, and neck, and be used for forming a custom-fitted helmet that covers only a top portion of customer head 30 or an entirety of customer head 30 including the face, chin, and neck.

As shown in FIG. 4C, graphical representation 66, including any offset, can be imported into a 3D tooling model 70 and points of the graphical representation 66 are aligned with corresponding points of the tooling model. The headform of tooling model 70 can be made to expose a shape of customer head 30. A headform may be created, such as by a 3D printer or other method, to create a specific mold for use in creating a custom-fitted helmet. Alternatively, a helmet base unit may be sculpted to match the contours of customer head 30. Either way, the result is a custom-fitted helmet formed from the customer's 3D headform 66 to provide a custom-fitted helmet that is customized to the topography or the length, width, and at least one contour of customer head 30.

Figure 5A:
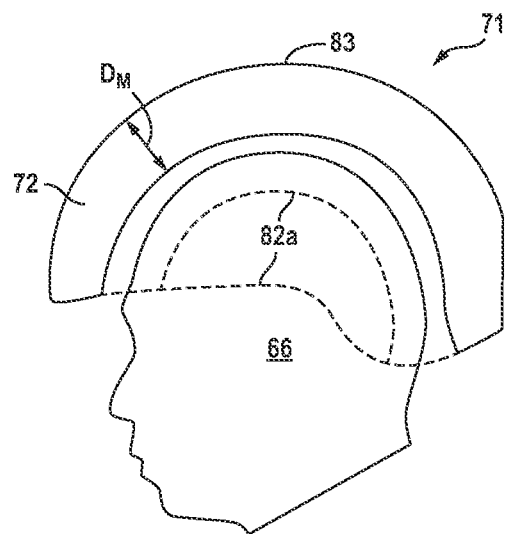
FIGS. 5A-5C show head data being compared to a helmet safety standard for forming a custom-fitted helmet.
Figure 5B:
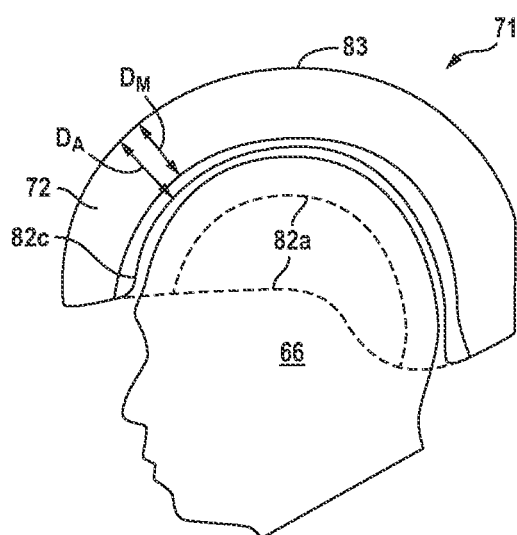
Figure 5C:
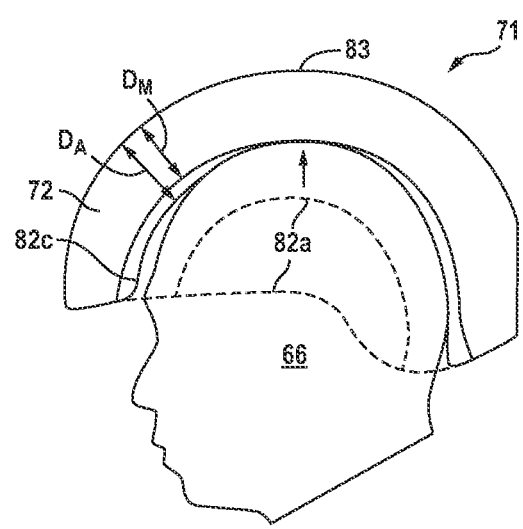

FIGS. 5A-5C show a comparison between 3D headform 66 and a helmet safety standard 71. 3D headform 66 can be used in an automated or graphic visual comparison with helmet safety standard 71 stored in association with processors associated with database 24. In particular embodiments, a protective base material can be disposed between an outer surface 83 of custom-fitted helmet 81 and a custom inner surface 82 of the helmet. Protective base material 72 can be formed of an energy absorbing material or energy attenuating material such as EPS, expanded polypropylene (EPP), plastic, foam, expanded polyethylene (PET), vinyl nitrile (VN), polyurethane (PU), ethylene-vinyl acetate (EVA), cork, rubber, orbathane, EPP/EPS hybrid (Zorbium), EPLA, brock foam, or other suitable material or blended combination or hybrid of materials. Protective base material 72 can protect customer 20 and customer head 30 through absorbing or attenuating energy during impacts by plastically or elastically deforming. In an embodiment, for example, EPS foam can be crushed during impact to protect customer head 30 during an impact. Protective base material 72 can be provided in such a way as to ensure that protective base material 72 meets predetermined minimum dimensions (DM) as required by safety standard 71. Minimum dimensions DM can be specified by particular safety regulations or standards of the sport or activity to which the helmet applies, by particular manufacturing specifications or realities for manufacture of the helmet, or by a governing or regulatory bodies. Exemplary regulatory bodies and standards as known by persons in the art include standards established by the International Standards Organization (ISO), the United Nations Economic Commission for Europe (ECE) testing standards, as commonly applied in Europe, the United States Department of Transportation (DOT), and the Snell Memorial Foundation (a not for profit organization dedicated to research, education, testing, and development of helmet safety standards).

As shown in FIG. 5A, 3D headform 66 of customer 20 can be automatically or graphically compared to helmet safety standard 71, including minimum dimensions DM, to determine suitable sizing and dimensions for custom-fitted helmet 81. Based on 3D headform 66 and minimum dimensions DM, custom-fitted helmet 81 can be formed comprising a custom inner surface 82c comprising a topography that conforms to the length, width, and at least one contour of customer head 30. As shown in FIG. 5B, actual dimensions (DA) as measured for custom-fitted helmet 81, are greater than or exceed the minimum dimensions DM required by helmet safety standard 71. As shown in FIG. 5C, actual dimensions DA as measured for custom-fitted helmet 81, can be greater than or equal to the minimum dimensions DM required by helmet safety standard 71. In some instances, a first portion of custom inner surface 82c can be formed such that a thickness or distance between custom inner surface 82c and outer surface 83 can be substantially equal to or approximate a minimum dimension DM required by helmet safety standard 71. As shown in FIG. 5C, the portion of custom inner surface 82c disposed over a top portion or crown of customer head 30 such that a thickness or distance between custom inner surface 82c and outer surface 83 is substantially equal to minimum dimension DM. Accordingly, a second portion of custom inner surface 82c can be formed such that a thickness or distance between custom inner surface 82c and outer surface 83 is greater than a minimum dimension DM required by helmet safety standard 71, such as the portions of custom inner surface 82c disposed around a periphery or outside the top crown portion of customer head 30.

FIGS. 6A-6F, similar to FIGS. 5A-5C, show an embodiment in which custom-formed helmet 81 is compared against a helmet safety standard 71 that includes more than a minimum thickness of protective base material 72 to satisfy the helmet safety standard. More specifically, FIGS. 6A-6F show a method for establishing a test line or test plane 73 for the testing of custom-fitted helmet 81. Test line 73 can be derived from a certified surface 77 rather than from a custom formed custom inner surface 82 of helmet 81. As described in greater detail below, the establishment of test line 73 from certified surface 77 can be done graphically or analytically with headform 66 of customer 20.

Figure 6A:
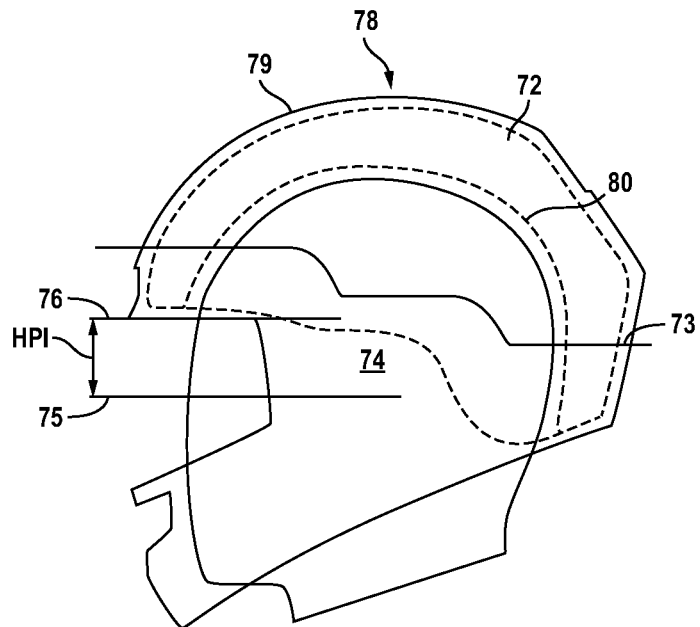
FIGS. 6A-6F show a custom-formed helmet compared against a helmet safety standard.

FIG. 6A shows a cross-sectional view of a test headform 74. Test headform 74 can be a tangible physical object or an analytical or computer model that facilitates or allows for virtual testing of physical helmets or models of helmets. When test headform 74 is a virtual helmet or model, the test headform can include a CAD file, or other suitable computer file or program. Test headform 74, whether physical or virtual, can be appropriately sized, configured, or made to posses or correspond to any attribute or requirement of helmet safety standard 71. Test headform 74 is configured to receive test helmets, such as helmet 78, and facilitates testing of the helmets to see if the helmets satisfy the relevant safety standards, such as helmet safety standard 71.

FIG. 6A further shows a helmet test line 73 formed on or associated with test headform 74 as an example of how a helmet safety standard 71 might be used in testing a helmet or non-custom-fitted helmet 78. A helmet 78, which is to be tested against safety standard 71, can then be positioned on headform 74 and helmet test line 73 can then be transferred from the headform to an outer surface or shell of a helmet 78 for testing. During testing, test line 73 is used as a demarcation for indicating where helmet 78 can be subjected to impacts during testing. For example, tested helmet 78 may be subjected to impacts that are centered on or above test line 73. Impacts used in the testing of helmet 78, or any helmet, occur at or above test line 73 at a top portion of a helmet because the top portion of the helmet is typically the most important for protecting user head 30, and impacts on a lower portion of helmet 78 below test line 73 will normally cause the helmet to fail. Test line 73 can be formed of any approved or certified shape in accordance with helmet safety standard 71. As a non-limiting example, test line 73 is shown in FIGS. 6A-6F as a typical test line approved or used by the Snell Foundation.

As shown in FIG. 6A, test line 73 is transferred from test headform 74 to outer surface 79 of helmet 78 so that a position or location of test line 73 is formed on, or associated with, helmet 78. The position of test line 73 on helmet 78 is based on a fit between test headform 74 and helmet 78. A relative position between test headform 74 and outer surface 79 of helmet 78 can be established by using basic plane, Frankfurt plane, or auricuolo-orbital plane 75 and a helmet positioning index (HPI) relative to a point or plane of helmet 78, such as upper faceport edge 76 at a front of the helmet. Basic plane 75 is an anatomical position of headform 74, a human skull, or customer head 30 defined by a plane passing through a left orbitale (or the inferior margin of the left orbit or eye-socket of the skull) and also passing through the left and right portions or the upper margins of each ear canal or external auditory meatus. The HPI defines a distance between basic plane 75 of test headform 74 and a portion of helmet 78, such as a front portion of upper faceport edge 76 of helmet 78. HPI can include any suitable distance based on the features and needs of a particular customer including distances in a range 35-65 millimeters (mm), 40-55 mm, or about 47 mm.

Thus, in order to determine a location of test line 73 relative to outer surface 79 of helmet 78 and which portions of helmet 78 will be subjected to impact testing, the helmet is positioned with respect to test headform 74 so that an outer surface of test headform 74 "contacts" inner surface 80 of helmet 78. A front portion of a brow of customer head 30 can be placed in contact with a brow portion of inner surface 80 near an upper edge of the faceport. Helmet 78 can then be rotated so that a top or crown portion of customer head 30 is placed in contact with a crown portion of inner surface 80. Helmet 78 can be positioned with respect to test headform 74 by placing a physical or tangible helmet on a physical or tangible headform, although more commonly a graphical or analytical comparison is made using computer generated 3D images of the helmet and test headform. With helmet 78 on test headform 74, test line 73 is transferred from the headform to the helmet, thereby designating the regions or portions of the helmet that can be impacted during testing, for example on a test rig.

When a mass produced helmet of standardized sizing and standardized inner surface is tested, such as helmet 78, the relative positions of headform 74 and any helmet 78 selected from the mass produced group will be substantially identical or constant for all helmets in a group because inner surface 80 for each helmet 78 is standardized and a shape of headform 74 is constant. Accordingly, the relative position of test line 73 will also be constant for each and every helmet 78. A constant relative position for test line 73 and helmet 78 allows for a small representative number of helmets to be destroyed in testing to certify that all helmets 78 of a particular design satisfy the appropriate safety standards.

To the contrary, custom-fitted helmet 81 includes a custom inner surface 82 of protective base material 72, or an inner surface 85 of padding or interface layer 84, such that each custom-fitted helmet 81 can have a different relative position with respect to test headform 74. Different relative positions between headform 74 and custom inner surface 82 potentially result in a new position or location for each test line 73 transferred from headform 74 to every custom-fitted helmet 81. Under conventional testing standards, each custom helmet would be required to be produced in multiples so that a number of custom-fitted helmets 81 could undergo destructive testing to ensure the design of a single custom-fitted helmet 81 worn by customer 20 satisfies the applicable safety standards. Because producing multiples of each custom-fitted helmet for destructive testing is not a commercially viable approach for producing and selling custom-fitted helmets, non destructive testing including analytically or graphically comparing a custom-fitted helmet 81 with a helmet safety standard 71 can be used. As a non-limiting example, an alternative method for testing custom-fitted helmets 81 is shown in FIGS. 6B-6F and discussed below.

Figure 6B:
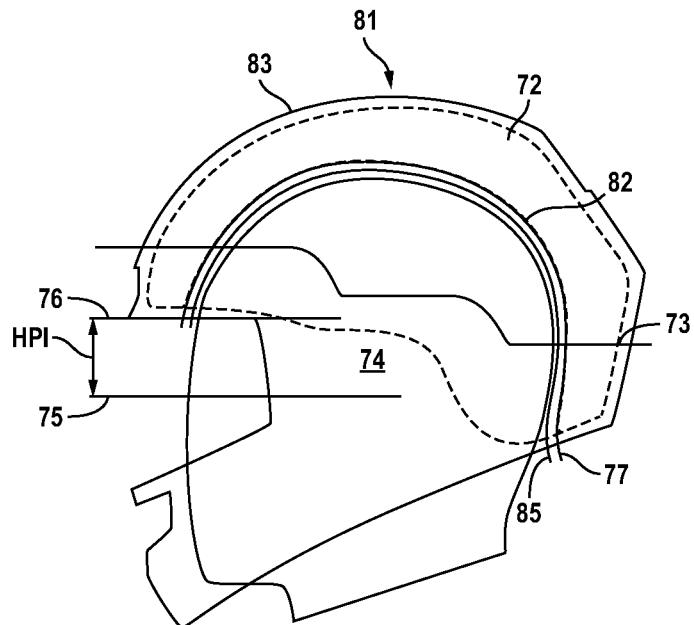

FIG. 6B shows a certified surface 77 for locating test line 73 on outer surface 83 of custom-fitted helmet 81 as part of a method for testing custom-fitted helmets. Certified surface 77 is generated and approved as part of helmet safety standard 71, and can be fixed with respect to outer surface 83 of custom-fitted helmet 81 to ensure a minimum thickness of protective base material 72 is used as part of the custom-fitted helmet. While certified surface 77 can be coextensive with an inner surface of protective base material 72 or coextensive with an inner surface 82 of custom-fitted helmet 81, certified surface 77 can also be different than inner surface 82 as discussed in greater detail with respect to FIG. 6C.

FIG. 6B, in contrast to FIG. 6A, shows a cross sectional view of test headform 74 within custom-fitted helmet 81 instead of non-custom fitted helmet 78. FIG. 6B also shows, in addition to certified surface 77, inner surface 85 of padding or interface layer 84. Padding layer 84 can be disposed between protective base material material 72 and headform 74 or 3D headform 66. Padding layer 84 can be a comfort layer of foam, padding, or other suitable material that can be softer or more deformable than protective base material 72. Padding layer 84 can be of any thickness, and in an embodiment, has a thickness in a range of 0-20 mm, 1-10 mm, or about 5 mm. Inner surface 85 is the surface of padding layer 84 that is closest to customer head 30, 3D headform 66, or headform 74. Thus a location, position, and contour of surface 85 of padding layer 84 can be determined and controlled by adding a distance or offset, representing a thickness of padding layer 84, to the topography or contours of inner surface 82 of custom-fitted helmet 81. The distance or offset can be constant for an entirety of padding layer 84 when a thickness of padding layer 84 is uniform and constant. Alternatively, the distance or offset can be variable or changing for at least a portion of padding layer 84 when a thickness of padding layer 84 is non-uniform or variable.

Certified surface 77 can be generated or selected based on data from numerous customer heads 30, including 3D headforms 66. By taking a group or set of head data for similarly sized heads, a certified surface 77 can be generated that would accommodate each of the heads included within the data set. Certified surface 77 does not need to exist physically, as a tangible structure within custom-fitted helmet 81 or as part of a helmet base unit 86, but can exist mathematically, graphically, or as part of a model. In an embodiment, for example, certified surface 77 exists as part of a computer executable program such as a piece of CAD software, and can be used for defining or generating test line 73.

Advantageously, certified surface 77 can be used for positioning headform 74 within custom-fitted helmet 81 or base unit 86 and transferring test line 73 from the headform to outer surface 83 of the custom-fitted helmet. In order to transfer test line 73 from headform 74 to outer surface 83 of the custom-fitted helmet, the test headform can be positioned in an uppermost and forwardmost position permitted by certified surface 77 (or another relative position or offset defined by certified surface 77 such as surface 85 of padding 84, which is referred to herein for convenience as the certified surface). As such, helmet 81 can be positioned with respect to test headform 74 so that an outer surface of test headform 74 aligns or is coextensive with certified surface 77. More specifically, a front portion of a brow of headform 74 can be aligned with a brow portion of certified surface 77 near an upper edge of the faceport. Helmet 81 can then be rotated so that a top or crown portion of headform 74 is aligned with a crown portion of certified surface 77, while also maintaining alignment with the brow portions.

Helmet 81 can be positioned with respect to test headform 74 by placing a physical or tangible helmet on a physical or tangible headform, although more commonly a graphical or analytical comparison is made using computer generated 3D images of the helmet and test headform. By aligning headform 74 toward the front and top portions of custom-fitted helmet 81, a gap, offset, or some space can exist between a rear portion of headform 74 and a rear portion of certified surface 77, especially for headforms of varying sizes including larger sizes. The gap can be filled with protective base material 72 by the formation of custom inner surface 82 based on a specific size or shape of an actual customer head 30 or 3D headform 66, as discussed below in relation to FIG. 6C. After test headform 74 is positioned within helmet 81, test line 73 is then transferred from test headform 74 to outer surface 83 of custom fitted helmet 81. In other words, a projection of test line or test plane 73 can be extended outwards until it contacts or intersects with outer surface 83 of custom-fitted helmet 81 and an actual mark, or a set of coordinates or data is noted or saved relative to outer surface 83 to identify which regions or portions of custom-fitted helmet 81 can be subsequently impacted during impact testing. In an embodiment, the test line 73 and the HPI are only used for certification purposes with the certified surface and certified headform. The certified headform 74 shows drawing a test line 73 can be done in a repeatable manner and therefore any custom 3D headform 66 would follow the same established test line 73 from an original certification.

Figure 6C:
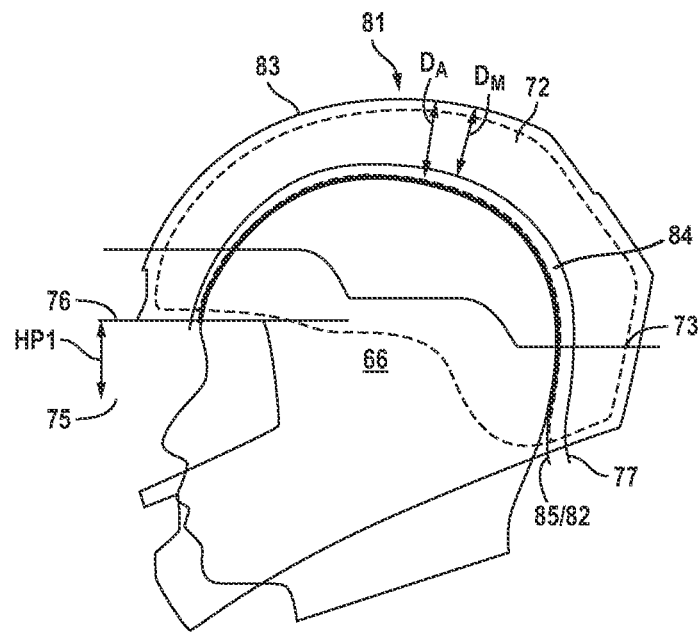

FIG. 6C shows a cross-sectional view of 3D headform 66, rather than test headform 74, disposed within custom-fitted helmet 81 comprising test line 73. FIG. 6C also shows how additional base material 72 can extend beyond, or be added to, certified surface 77 to provide custom inner surface 82 that can include a topography that conforms to a length, width, and at least one contour of 3D headform 66 or customer head 30 that is closer to 3D headform 66 than certified surface 77 is to the 3D headform. Custom inner surface 82 can also take into account, or include an offset for, padding or interface layer 84. Accordingly, a custom inner surface 82 of custom-fitted helmet 81 can include surface 85 of padding layer 84 as shown in FIGS. 6C-6F. Advantageously, 3D headform 66 can be positioned within custom-fitted helmet 81 and within certified surface 77 in such a way as to optimize a fit of customer head 30 within custom-fitted helmet 81 and to optimize a field of view (FOV) for customer 20. Additionally, 3D headform 66 can be positioned within custom fitted helmet 81 by aligning or matching the brow portion of headform 66 with the brow portion of custom inner surface 82 of custom fitted helmet 81 while also aligning crown portions of the 3D headform and custom inner surface.

By considering a position of an eye of customer 20 when positioning 3D headform 66 within custom fitted helmet 81, the FOV for customer 20 can be increased. In an embodiment, the eye of customer 20 can by aligned with a faceport of custom-fitted helmet 81 by adjusting a vertical offset or distance between the eye of the customer and the upper faceport edge 76, or the lower faceport edge, so that the edge of the faceport does not obstruct the customer's vision. Optimal eye position within the faceport can vary by application. For example, when maximizing customer FOV, a lower position of the faceport relative to a customer's eye is desirable for upright street riding, while a higher position of the faceport relative to a customer's eye is desirable for aggressive tucked race positions where a relative location of upper faceport edge 76 is an important constraint for visibility.

Additionally, a distance between the eye of customer 20 can also be moved closer to the faceport of custom-fitted helmet 81. In conventional or stock helmet designs, a user's head is centered front to back within the helmet and can produce a significant offset between a front of the helmet and the front of customer head 30. As a result of the offset between the user's eye and the front of the helmet, edges of a helmet faceport can obscure more of the user's FOV. On the other hand, by orienting customer head 30 the farthest forward permissible by applicable safety standard 71, FOV can be improved for customer 20 by reducing an amount of obstruction created by faceport edges of custom-fitted helmet 81. Gains achieved by moving a customer's head farther forward can also be greater for those customers that have heads that are shorter front to back. Applicants have discovered that even small changes in distances between the eye of customer 20 and a front of the helmet, or vertical distances between the customer's eye and the upper and lower edges of the helmet faceport, can have significant effects on the area of the customer's FOV.

Once 3D headform 66 is properly aligned within custom-fitted helmet 81, unwanted gaps or spaces between certified surface 77 and the 3D headform can be identified and eliminated by providing protective base material 72 (and optionally padding 84) to fill the gap between certified surface 77 and customer 3D headform 66. While providing protective base material 72 within the gap between certified surface 77 and 3D headform 66 can be thought of as "filling" the gaps, in some embodiments, gaps will not physically exist between a physically constructed custom inner surface 82 and customer head 30. For example, an analytical or computational comparison can be made physically, graphically, analytically, with CAD software, or with other suitable program before forming custom inner surface 82 so that the custom inner surface can be formed, such as by being cut, from helmet base unit 86 to conform to the length, width, and at least one contour of the customer's head without an unwanted gap existing between certified surface 77 and 3D headform 66 or customer head 30.

By forming custom inner surface 82 with additional base material 72 between 3D headform 66 and certified surface 77, custom-fitted helmet 81 may be more comfortable than a standardized or certified helmet that has base material 72 only extending to certified surface 77. Also, the custom-fitted helmet 81 will satisfy safety standard 71, or can be effectively tested using the same test line 73 for an entire class of custom-fitted helmets 81 instead of requiring destructive testing for each new custom-fitted helmet 81 that is made. Stated another way, any custom-fitted helmet 81 that includes a custom inner surface 82 that is outside or offset from certified surface 77 by having a minimum distance between outer surface 83 and custom inner surface 82 that is greater than a minimum distance between outer surface 83 and certified surface 77, will also satisfy safety standard 71 or can be effectively tested using the same test line 73. Stated yet another way, any custom-fitted helmet 81 that includes a custom inner surface 82 that does not place customer head 30 or 3D headform 66 in such a way as to extend through or beyond certified surface 77 toward outer surface 83, will also satisfy safety standard 71, or can be effectively tested using the same test line 73.

As such, in an embodiment, a person having ordinary skill in the relevant art will understand that certified surface 77 is a baseline surface indicating that any other custom inner surface 82 position outside (or more distant from outer surface 83 that certified surface 77) will produce helmets that meet the helmet safety standard, or can be effectively tested using the same test line 73. Accordingly, custom-fitted helmets 81 comprising custom inner surfaces 82 can be certified by measuring against certified surface 77 and testing against test line 73 without each custom-fitted helmet needing to undergo destructive testing like a non-custom fitted helmet 78, as described above. Therefore, use of test headform 74 for the creation of a uniform test standard such as test line 73 relative to a certified surface 77 for a range or class of custom-fitted helmets 81 can remove the economic burden produced by destructive testing of each custom-fitted helmet 81, making large scale production of safety certified custom-fitted helmets practical.

Figure 6D:
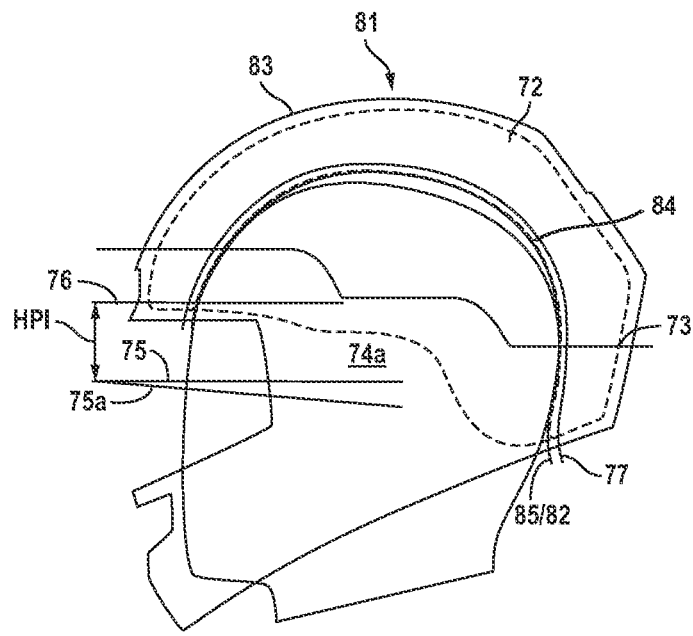
Figure 6E:
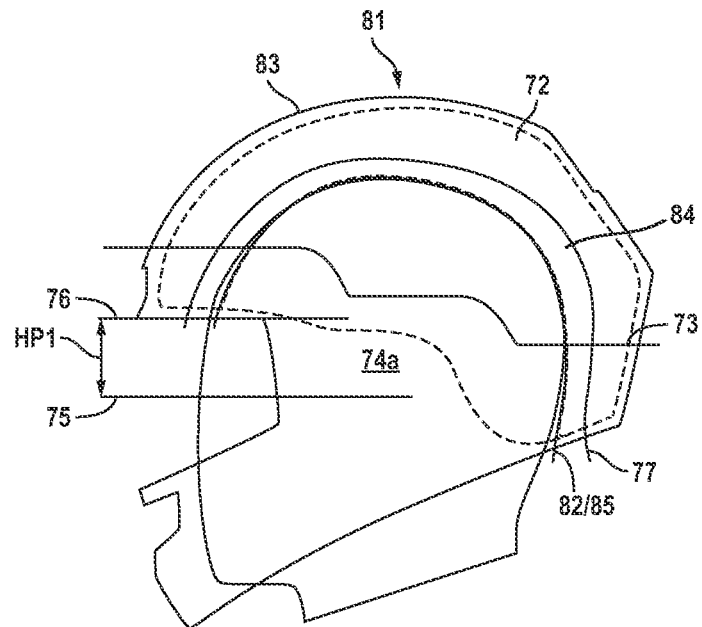
Figure 6F:
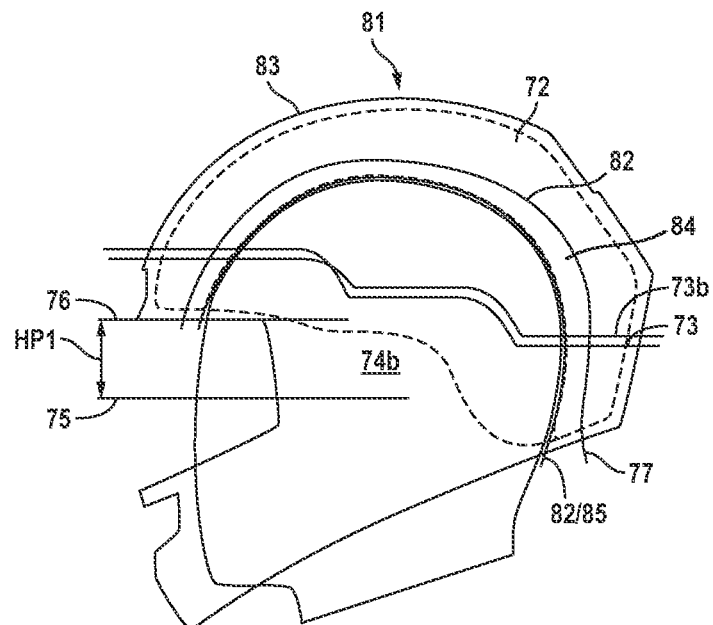

As a non-limiting example, Applicant has worked with responsible parties at the Snell foundation and established an acceptable working method for consistently positioning ISO headforms with respect to certified surfaces 77 and within custom-fitted helmets 81, or models of the same, in such a way that test lines 73 will be constant or fixed with respect to various custom-fitted helmets, thereby allowing a single test to certify the safety of a number of similar helmets all having different inner surfaces, without the waste of destroying custom made helmets. FIGS. 6D-6F, described in greater detail below, illustrate a non-limiting example of how Applicant has worked with the Snell Foundation to produce a procedure for testing custom-fitted helmets 81.

FIG. 6D shows a medium ISO test headform 74a disposed within a custom-fitted helmet 81 that comprises a certified surface 77 for a medium sized head or headform. However, because customer heads have unique topographies including differing lengths, widths, and contours from each other, the generic shape and contour of test headform 74a is different from custom inner surface 82. Custom inner surface 82 extends out from certified surface 77, or stated another way, includes an actual dimension DA greater than minimum dimension DM associated with certified surface 77. As such, custom inner surface 82 is only partially in contact with headform 74a and is not properly situated within custom-fitted helmet 81 as headform 66 or customer head 30 would be. FIG. 6D shows headform 74a includes basic plane 75a that is rotated with respect to nominal basic plane 75 that is offset from the top of the helmet faceport by the HPI. FIG. 6D also shows that a top crown portion of headform 74a is not in contact, or aligned, with a top crown portion of custom inner surface 82. Instead, the top crown portion of headform 74a is offset from, and has a gap with respect to, the top crown portion of custom inner surface 82. Both the rotation and the poor fit between headform 74a and custom inner surface 82 can provide problems for using the headform for testing.

Similarly, FIG. 6E shows an alternative configuration in which custom inner surface 82 provides a problem for using medium ISO test headform 74a for testing. In FIG. 6E, medium ISO test headform 74a is disposed within a custom-fitted helmet 81 that comprises the custom inner surface 82 shown in FIG. 6D. However, instead of having basic plane 75a of headform 74a different from the nominal basic plane 75, FIG. 6E shows the basic plane 75a of headform 74a aligned with the nominal basic plane and properly offset from upper faceport edge 76 according to the HPI. However, because the generic shape and contour of test headform 74a is different from custom inner surface 82, headform 74a is shown extending beyond inner surface 82. Practically speaking, by allowing headform 74a to extend beyond inner surface 82, the model presents a situation in which a customer head 30 would be occupying space occupied by protective base material 72. As such, the configuration shown in FIG. 6E is also impractical for impact testing custom-fitted helmet 81 because misalignments between medium headform 74a and inner surface 82 of custom-fitted helmet 81 result from the unique length, width, and contours of an actual customer head 30 or headform 66 used for the formation of custom inner surface 82. Therefore, the misalignments between medium headform 74a and inner surface 82 of custom-fitted helmet 81 shown in FIGS. 6D and 6E suggest a medium ISO test headform 74a is too large for at least some custom-fitted helmets 81 comprising a certified surface 77 designed for medium head sizes.

FIG. 6F shows an embodiment in which a smaller ISO headform such as small ISO test headform 74b, rather than a medium ISO test headform 74a, is disposed within a custom-fitted helmet 81 for the testing of the custom-fitted helmet comprising a certified surface 77 for a medium sized head or headform. By using small ISO test headform 74b, headform 74b can fully contact all portions of custom inner surface 82 and be properly situated within custom-fitted helmet 81 as headform 66 or customer head 30 would be. Additionally, by using small ISO test headform 74b the basic plane of headform 74b can also be aligned with the nominal basic plane and properly offset from upper faceport edge 76 according to the HPI. Thus, the smaller volume of headform 74b allows for more flexibility in fitting the headform within an area of custom inner surface 82 that is less than an area of certified surface 77. Additionally, in order for small ISO headform 74a to provide acceptable testing results for a medium sized certified surface, the small ISO headform 74a can be weighted to match, and to respond during testing, as medium sized ISO headform 74b.

The exemplary embodiment of FIG. 6E shows test line 73b associated with headform 74b and aligning on outer surface 83 of custom-fitted helmet 81 at a position or location different from test line 73. However, the presence of differently positioned test lines resulting from different ISO headforms can be ignored for the purposes of establishing the impact line so long as the ISO headform being used is properly aligned with helmet and 81 and within, or does not pass through) certified surface 77. Thus, the established test line 73 is used for impact testing while using the properly weighted small ISO headform 74b. While test headforms 74a and 74b have been referred to as medium and small sized headforms respectively, a person of ordinary skill of the art will understand that any first and second headforms of differing sizes could be used and be equally applicable to the foregoing example.

Furthermore, as has been discussed in relation to FIGS. 6B-6F, different ISO headforms can be used for establishing a test line and for conducting impact testing, which is in contrast to conventional testing in which only a single ISO headform has been used for both establishing the test line and the conducting the impact testing. As discussed above, a first ISO headform, such as headform 74 shown in FIG. 6B, can be used for establishing the location and position of test line 73 with respect to certified surface 77. A second ISO headform, such as headform 74b shown in FIG. 6F, can be used for conducting the impact testing of custom-fitted helmet 81.

After determining what inner surface 82 of custom-fitted helmet 81 will be, based for example on customer head data and helmet safety standard 71, inner surface 82 can be formed. As indicated above with reference to FIG. 4C, and shown in FIGS. 7A-7B, a helmet base unit 86 can be used to form custom-fitted helmet 81, including inner surface 82, which is customized to the topography or the length, width, and at least one contour of customer head 30 or 3D headform 66. Helmet base unit 86 can be made of impact protective material that is easily removable or cuttable to conform to customer head 30, headform 66, or both. Helmet base unit 86 can be formed of an energy attenuating material such as EPS, EPP, plastic, foam, PET, VN, PU, EVA, cork, rubber, orbathane, Zorbium, EPLA, brock foam, or other suitable material or blended combination or hybrid of material.

Figure 7A:
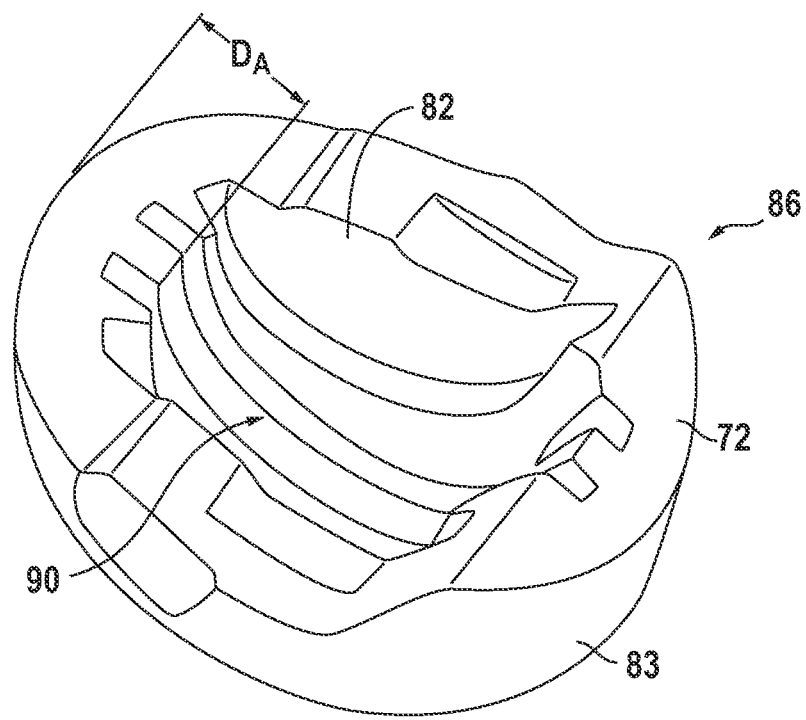
FIGS. 7A-7D show forming a custom-fitted helmet including a finished inner surface comprising a topography that matches a customer's head.
Figure 7B:
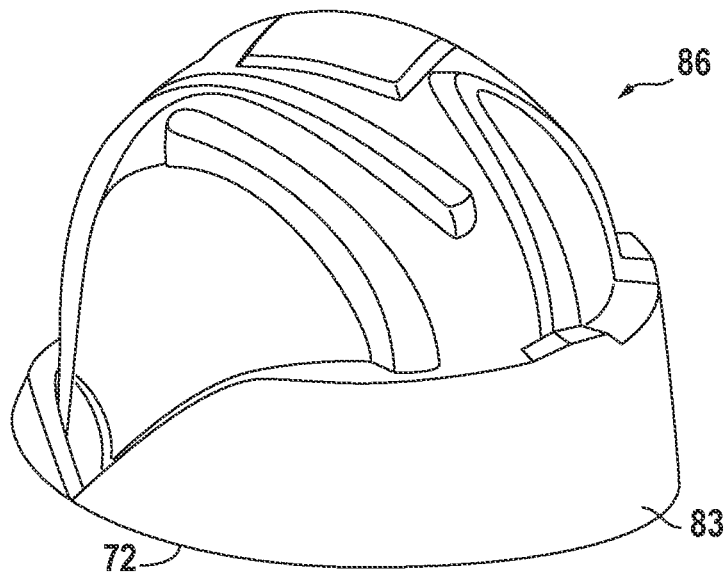

Helmet base unit 86 includes an outer surface 83, a custom inner surface 82, and protective base material 72 between the outer and inner surface that will accommodate both helmet safety standard 71 and 3D headform 66. Thus, helmet base unit 86 can be of any size and shape before being customized to fit customer head 30. Customization of base unit 86 for the formation of custom-fitted helmet 81 can be by an additive or subtractive process. In fact, helmet base unit helmet 86 may, in particular customizable embodiments, be initially formed as a block of protective material that is entirely trimmed down to form the customized helmet shape and design that conforms to customer head 30 according to 3D headform 66. Thus, helmet base unit 86 can be initially formed as a non-descript block base unit or as a helmet-shaped base unit that includes material inside and outside of the final customized helmet, which will be customized through removing excess material from the helmet base unit. Alternatively, helmet base unit 86 can be a helmet-shaped base unit that includes material inside that will be customized through removing excess material and an outer surface 83 that does not require customization. An example of a helmet base unit 86 that includes an outer surface 83 that does not require customization and a custom inner surface 82 that leaves material inside the helmet base unit that will be customized is illustrated in FIG. 7B. Additionally, formation of custom-fitted helmet 81 can be formed by an additive process, such as 3D printing, to build-up outer surface 83 and custom inner surface 82.

However, in order to minimize an amount of protective base material 72 that can be removed to reduce or minimize weight and size of custom-fitted helmet 81, helmet base unit 86 can be formed such that outer surface 83 is formed with a shape, form, and contour equal to a final shape, form, and contour of the final custom-fitted helmet 81. Similarly, helmet base unit 86 can be formed such that custom inner surface 82 includes a shape, form, and contour that approximates or is somewhat larger than the final shape, form, and contour of custom inner surface 82 of completed custom-fitted helmet 81. Thus, by preparing a helmet base unit 86 that approximates a final shape and design of custom-fitted helmet 81, the amount of protective base material 72 that is removed for customizing custom inner surface 82 is reduced.

In order to ensure that helmet base unit 86 approximates a final shape and design of custom-fitted helmet 81, for a plurality of customers of different head shapes and sizes, a number of helmet base unit models including sizes ranging from a small size to a large size can be provided. Thus, helmet base unit 86 can be selected from a number of helmet base unit models to have the smallest possible helmet size, thereby minimizing helmet weight and size while still allowing customer 20 to have a custom-fitted helmet 81 with a thickness greater than or equal to minimum dimension DM of helmet safety standard 71 between a surface of customer head 30 and outer surface 83 of custom-fitted helmet 81. Dimensions of helmet base unit 86 can then be altered to generate a computerized helmet model 88. Computerized helmet model 88 includes at least a digital data set indicative of a portion of a helmet. In some embodiments, computerized helmet model 88 includes a model of at least custom inner surface 82 of custom-fitted helmet 81. Additionally, and as discussed more fully below, in some cases all of the dimensions of the custom-fitted helmet 81 may be calculated by a processor associated with the database 24. In a particular embodiment, a graphical comparison can be made visually or analytically between headform 66, minimum dimensions DM of helmet safety standard 71, and helmet base unit 86 to visually determine if any minimum dimensions DM are not met and extend into a space occupied by headform 66 or extend beyond helmet base unit 86. If a portion of headform 66 does extend into at least a portion of minimum dimensions DM for helmet base unit 86, a larger or different helmet base unit model is chosen.

Figure 7C:
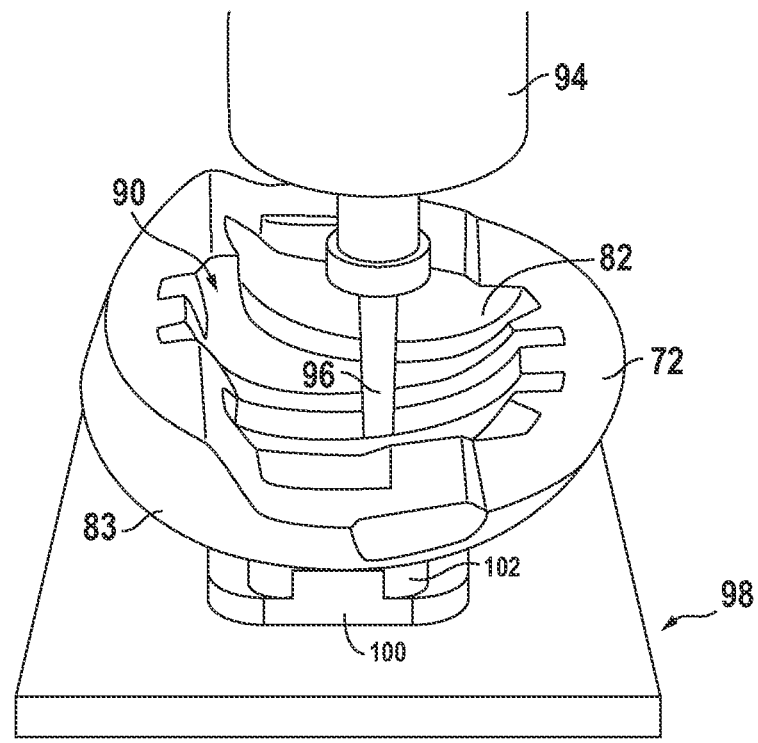

As shown in FIG. 7C, after obtaining head data for customer head 30 and optionally generating 3D headform 66, the 3D headform or head data is compared to helmet safety standard 71 to form custom-fitted helmet 81 based on the 3D headform or head data such that the custom-fitted helmet satisfies the safety standard 71 and custom inner surface 82 comprises a topography that conforms to the length, width, and at least one contour of the customer head. Forming of custom-fitted helmet 81 can be at a second location, different from the first location where the head data for customer head 30 is obtained. As indicated above, custom-fitted helmet 81 can be formed by an additive or subtractive process. For subtractive processes in which material is removed to form custom inner surface 82, an appropriate helmet base unit 86 is determined, as described above, that will allow for the minimum dimensions DM required to satisfy helmet safety standard 71, while minimizing or reducing additional helmet thickness and weight not required for comfort. In a particular, non-limiting embodiment, helmet base unit 86 is selected to have a size from which about 6 mm-8 mm of material is removed to form custom inner surface 82 of custom-fitted helmet 81. Accordingly, a head cavity 90 of helmet base unit 86 is approximately 20% smaller than head cavity 92 of custom-fitted helmet 81. Stated another way, head cavity 90 of helmet base unit 86 includes a size or volume approximately 81% of a size or volume of head cavity 92. However, various other standard initial thicknesses, volumes, and sizes may be used and could be more practical depending upon a number of factors, including a style of helmet, a type of impact protection provided, a type of material used, or a combination of factors.

Depending upon what type of material is used for protective base material 72 of helmet base unit 86, any of several different methods may be used to remove excess protective base material 72 from the helmet base unit. Those of ordinary skill in the art will readily understand or determine without undo experimentation which method of removing protective base material 72 is best based on a composition of the protective base material. FIG. 7C shows use of a CNC machine or routing machine 94 including cutting blade 96 is a method that works well for removal of excess protective base material 72 comprising EPS. To the contrary, use of a CNC machine can be less effective for EPP than with EPS because EPP tends to melt or deform during removal of protective base material 72 with CNC machine 94. Rotating cutting blade 96 is used to carve away excess protective base material 72 from helmet base unit 86 so that custom inner surface 82 comprises a topography that conforms to customer head 30, 3D headform 66, or both. An appropriate jig 98 can be used to hold helmet base unit 86 during removal of a portion of protective base material 72. Jig 98 can include any structure configured to prevent undesired movement of base unit 86 during removal of protective base material 72. As shown in FIG. 7C, jig 98 can comprise interlocking members 100 that interface with jig 98 and are configured to interlock with helmet base unit 86. Helmet base unit 86 can include posts or protrusions 102 formed as part of the helmet base unit and configured to interlock with jig 98. Posts 102 can be of any shape and can be built-up on helmet base unit 86, or alternatively, can be formed as openings or holes that act as receptors for receiving interlocking members 100 of jig 98. When posts 102 are formed as protrusions extending away from outer surface 83, the posts may be removed or may be covered by other coverings on the finished custom-fitted helmet 81 after having been used to interlock with jig 98. Alternatively, the jig may be formed to interlock or interface with a permanent feature or shape on the helmet base unit that is not removed by subsequent processing.

Importantly, customization of custom inner surface 82 to include a topography that conforms to the length, width, and at least one contour of the customer head 30 can be done with any shape or style of helmet. Other non-limiting examples for other helmet types are shown in FIGS. 8A-9D. In particular embodiments, excess protective base material 72, including posts 102, can be removed after helmet base unit 86 has been coated or inserted into an outer shell such as a decorative outer shell. Alternatively, excess protective base material 72, including posts 102, can be removed before helmet base unit 86 has been coated or inserted into an outer shell, or removed without subsequent use of an outer shell.

Figure 7D:
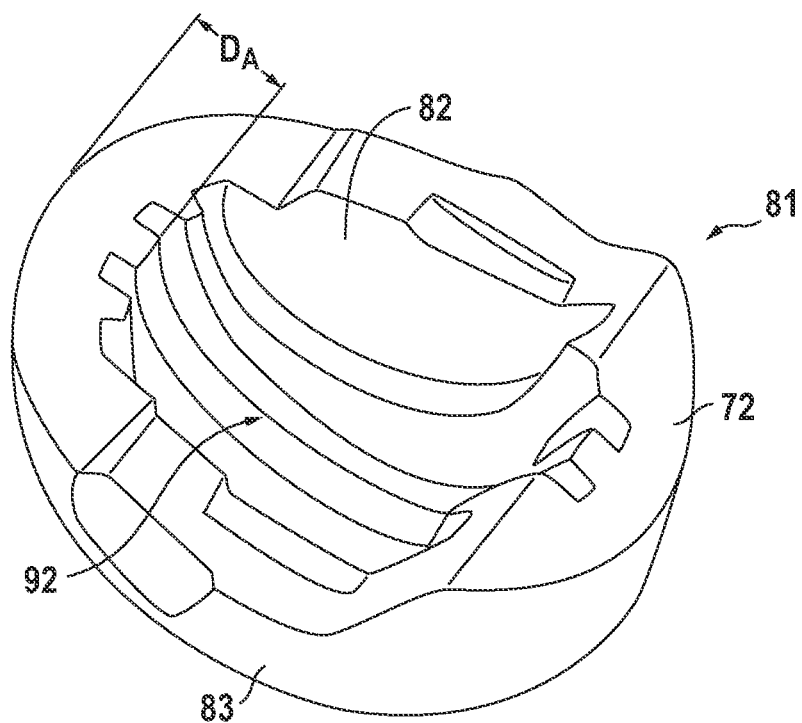

FIG. 7D shows custom-fitted helmet 81 including a finished custom inner surface 82 comprising a topography that comprises a length, width, and at least one contour of customer head 30. Custom-fitted helmet 81 of FIG. 7D differs from helmet base unit 86 shown in FIG. 7A in that a thickness or an actual dimension DA between outer surface 83 and custom inner surface 82 of custom-fitted helmet 81 in FIG. 7D is less than a thickness or an actual dimension DA between outer surface 83 and custom inner surface 82 of helmet base unit 86 shown in FIG. 7A. Stated another way, the actual dimension DA between outer surface 83 and custom inner surface 82 of helmet base unit 86 in FIG. 7A is greater than the thickness or actual dimension DA between outer surface 83 and custom inner surface 82 of custom-fitted helmet 81 in FIG. 7D.

The process of forming a customized custom inner surface 82 for custom-fitted helmet 81 is applicable not only to a tangible helmet base unit 86, but is likewise applicable to computerized helmet models 88. In an embodiment, a computerized helmet model 88 can be a virtual or graphical model that comprises dimensions, forms, shapes, contours, and characteristics of a final helmet that include an outer surface 83 and also satisfies helmet safety standard 71. In other words, computerized helmet model 88 can be a virtual representation of a tangible or physical helmet base unit 86. A portion of computerized helmet model 88 can be formed or modified based on head data of customer head 30 or based on 3D headform 66. Specifically, computerized helmet model 88 can be formed or modified such that a custom inner surface 82 comprises a topography that conforms to a length, width, and at least one contour of customer head 30, 3D headform 66, or both. Computerized helmet model 88 can be used as a starting point for customization of a custom inner surface 82 by modifying helmet base unit 86 to form custom-fitted helmet 81, as indicated above with respect to FIGS. 7A-7D. Alternatively, computerized helmet model 88 can be used to form custom inner surface 82 by an additive process. Custom inner surface 82 of custom-fitted helmet 81 can be created, for example, using a 3D printer, a customer head data-specific mold, or other one-time or one-off manufacturing method, including, by way of example and not by limitation, physical casting with plaster, Room Temperature Vulcanizing (RTV), or casting or molding with Urethane, Clay, Wax, Paper Mache or other materials used for casting, molding, or copy milling.

Figure 8A:
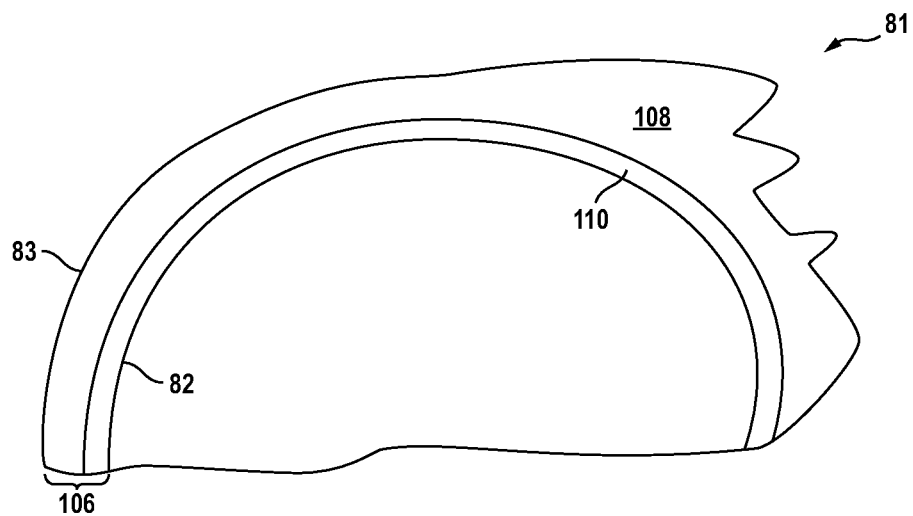
FIGS. 8A and 8B show another embodiment of a custom-fitted helmet.

FIG. 8A shows a cross sectional view of custom-fitted helmet 81 formed as a multi-layer helmet 106 that includes an outer layer or first layer 108 and an inner layer or second layer 110. Outer layer 108 includes outer surface 83 and inner layer 110 includes custom inner surface 82. While multi-layer helmet 106 is shown with two distinct layers, namely outer layer 108 and inner layer 110, any number of a layers can be used, including any number of layers disposed between the custom inner surface 82 and outer surface 83.

Inner layer 110 can be formed of a material that is identical, similar, or different from outer layer 108. Inner layer 110 can be coupled to outer layer 108 by chemical bonds, mechanical bonds, or both, and can be coupled using an adhesive, a bonding agent, or friction. Outer layer 108 can be a standard helmet shell of impact protective material similar to helmet base unit 86 that includes a protective base material 72 and further comprises an outer surface 83. An inner surface of outer layer 108 is not configured to be in contact with user head 30, but instead is configured to be in contact with, or coupled to, one or more inner layers 110.

Custom inner surface 82 of inner layer 110 can be formed by an additive or subtractive process. Inner layer 110 can be applied as a separately manufactured insert from outer layer 108, in which inner layer 110 is formed by spraying or as another molded material added to outer layer 108 during manufacturing, or later, or in any other manner known in the art. Portions of one or more inner layers 110 can be sculpted or otherwise removed as part of a subtractive process such that custom inner surface 82 conforms to head data for customer head 30 or 3D headform 66. A final custom inner surface 82 can be formed either before inner layer 110 is added to outer layer 108, or after inner layer 110 is added to outer layer 108. Inner layer 110 includes custom inner surface 82 that comprises a topography that conforms to the length, width, and at least one contour of customer head 30. Custom inner surface 82 can be in direct contact with customer head 30 or customer hair 32. Alternatively, custom inner surface 82 can be coupled or in contact with one or more padding or interface layers 84 that are in direct contact with customer head 30 or customer hair 32. Padding layer 84 can be disposed over custom inner surface 82 of custom-fitted helmet 81, as a layer comprising a uniform thickness. Alternatively, padding layer 84 can be formed as a layer comprising a variable or differing thickness in which various portions of the padded layer can be formed with different amounts of padding or cushioning relative to specific portions of customer head 30 or custom-fitted helmet 81. However, when padding layer 84 is formed with variable thickness the different amounts of padding need not be used to account for differences between a topography of an inner surface of a generic helmet and a topography of the customer's head as has been conventionally done with generic one-size-fits-many helmets.

In particular embodiments, inner layer 110 can be formed of a material that is more easily removable or cuttable than outer layer 108. Depending upon the manufacturing processes used for forming custom inner surface 82, inner layer 110 can be formed of any suitable protective helmet material known in the art, including EPS, various foams, EPP, Plastic, expanded polyethylene, VN, PU, EVA, Cork, Rubber, Sorbathane, Zorbium, EPLA, brock foam, or combinations of any of the above.

For subtractive methods of forming custom inner surface 82 of inner layer 110, any of several different methods may be used to remove excess material from the inner layer depending upon the protective material used in forming helmet base unit 86. Those of ordinary skill in the art will readily understand or determine without undo experimentation based on the protective material used in helmet base unit 86, which method of removal is best for protective base material 72. One method that works well with removal of excess EPS is routing or CNC machining, as described above with respect to FIG. 7C. By forming multi-layer helmet 106 with outer layer 108 of impact protective material, and disposing inner layer 110 adjacent to the inner layer, a better fitting and better performing helmet can be achieved that is unique to each customer 20.

In an embodiment, as indicated above, an additional inner layer can be applied as an insert that is separately manufactured from an outer layer. The inner layer can, for example, be formed by spraying, or by any other manner known in the art. The inner layer insert includes inner layer 110, as shown and described with respect to FIG. 8A. Additionally, inclusion of an inner layer as part of a method for providing a custom-fitted helmet can be applicable to all helmet types, including full face helmets for various sports, as mentioned above, including motorsports and powersports, as is also indicated below, for example, with respect to FIGS. 9A and 9B. As a non-limiting example, a custom-fitted in-molded polycarbonate (PC)/EPS liner can be inserted into a stock helmet to replace an existing stock helmet liner or stock comfort padding layer. In such a case, a manufacturer, technician, or even customer 20 removes the existing comfort padding or liner from the stock helmet and places the custom manufactured insert (such as the custom-fitted in-molded PC/EPS liner) into the stock helmet. However, as customers are not typically experts of fitting helmets, in some embodiments, fitting by a manufacturer or trained technician is preferable. The custom manufactured insert is installed within the stock helmet to provide a customized version of the stock helmet. The custom manufactured insert can be installed into the stock helmet using existing mechanical fasters. For example, the custom manufactured insert can be installed in the stock helmet using the same padding snaps that were used to couple the stock comfort padding or liner to an outer layer of the stock helmet. Advantageously, the custom manufactured insert can further comprise comfort padding, which can be thinner than the existing comfort padding.

Figure 8B:
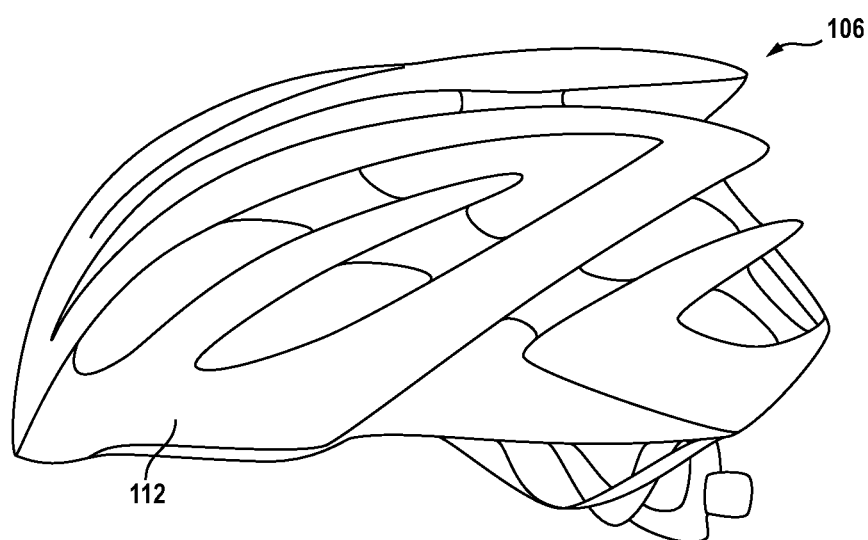

FIG. 8B shows a perspective view of multi-layer helmet 106. While multi-layer helmet 106 can be formed as any type of helmet, FIGS. 8A and 8B show a particular non-limiting embodiment for a bicycle helmet. For any of the embodiments disclosed or contemplated herein, additional customizing may be done to custom-fitted helmet 81, including forming a customized helmet protective material 112 as part of the custom-fitted helmet. For example, FIG. 8B shows protective material 112 formed as a protective, functional, or decorative outer shell formed over outer surface 83 of outer layer 108. Additional customization can further include padding layer 84 added to custom inner surface 82, straps including chin straps and neck straps coupled to custom-fitted helmet 81, as well as colors and stylistic features. Thus, those of ordinary skill in the art will readily understand from this disclosure that multiple levels of customization are now possible and practical in a business environment for the customization of custom-fitted helmets 81.

Figure 9A:
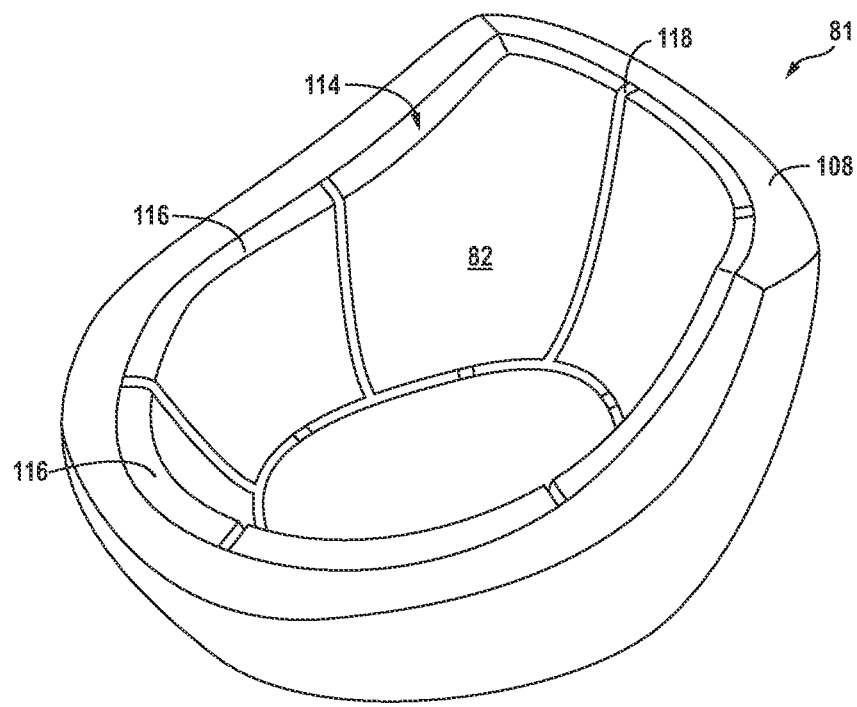
FIGS. 9A and 9B show other embodiments of a custom-fitted helmets.

FIG. 9A shows another embodiment of a custom-fitted helmet 81, in which an inner layer 114 comprising additional material can be added to outer layer 108, as described above with respect to FIGS. 8A and 8B. Inner layer 114 differs from inner layer 110 in that instead of being a being composed of a single monolithic piece like inner layer 110, inner layer 114 comprises a plurality of segments 116. Segments 116 can be a flexible, semi-flexible, extendable, or reconfigurable component that are permanently joined, temporarily joined, or separate from one another and separately attached to outer layer 108. Thus, segments 116 are formed in one or more contiguous or disjointed parts and assembled as one piece or as separate pieces to outer layer 108. FIG. 9A shows a gap or channel 118 is formed or exists between segments 116, such that the segments are not directly connected or do not directly contact one another.

Figure 9B:
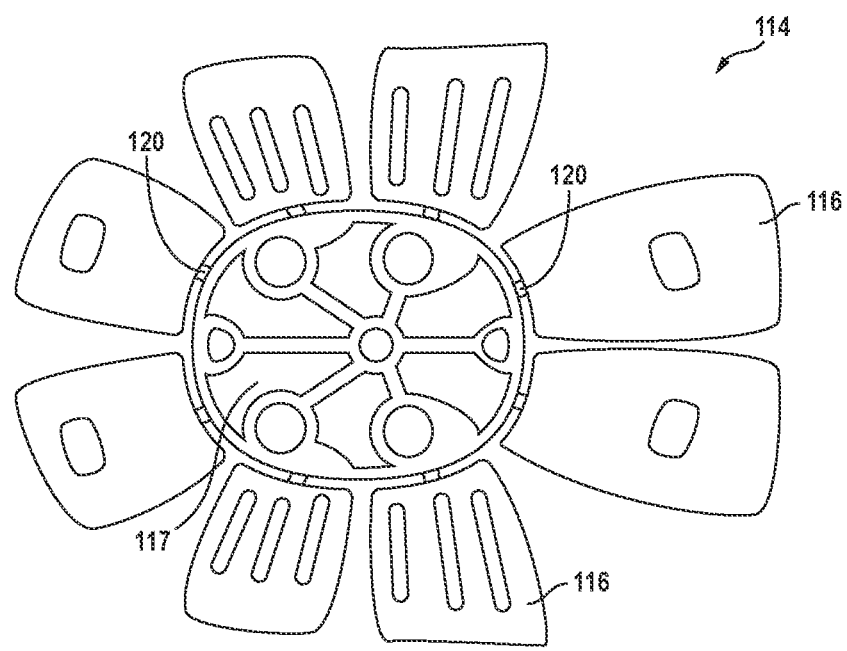

FIG. 9B shows another embodiment in which segments 116 are outside of outer layer 108 and are connected by joining members 120. Joining member 120 can be formed of aluminum, nylon, plastic, or other flexible material, and extend between segments 116 to provide a fixed or variable spacing, such as a gap or channel, between the segments. Joining members 120 can be partially exposed from segments 116 and partially embedded within the segments. Single or individual joining member can be coupled to, or extend through, multiple segments 116. In an embodiment, a plurality of segments 116, including a totality of segments 116, is connected with a single joining member 120 that includes separate spoke portions extending radially from a central area.

As illustrated in both FIGS. 9A and 9B, segments 116 can be manufactured outside of outer layer 108 and then assembled into a custom-fitted helmet 81, such as by being coupled to outer layer 108. Accordingly, segments 116 can be arranged to form inner layer 114 that comprises custom inner surface 82 and further comprises a topography that conforms to the length, width, and at least one contour of customer head 30 or headform 66.

FIG. 9B further shows segments 116 of inner layer 110 can be arranged or formed in a flat or planar array or a substantially flat or planar array with a number of segments 116 disposed around a central or crown segment 117 and attached by joining members 120. Similarly, segments 116 may also be formed in an array that is not completely flat or planar, but is sufficiently flat or planar to allow cutting blade 96 of CNC machine 94 or other sculpting tool to access portions of segments 116 necessary for forming custom inner surface 82. Advantageously, cutting blade 96 of CNC machine 94, or other sculpting tool, can be used to form, sculpt, or pattern custom inner surface 82 of segments 116 that would be inaccessible if not in a flattened form. For example, while segments 116 are disposed in the flat arrangement, removal of material from segments 116 in hard to reach places, such as at a portion of a helmet following a contour of a customer's occipital curve, are made accessible to traditional CNC or sculpting machines. Traditional CNC machines cannot create a helmet recurve to match a customer's occipital curve on a rigid helmet base unit because the cutting portion of the CNC machine cannot change an angle of the cutting blade from a strict vertical position to a required angled position. By placing segments 116 in a substantially flat or planar position, a topography of custom inner surface 82 can be formed to match contours of customer head 30 with only vertical access to segments 116. Thus, a custom-fitted helmet 81 can include a recurve formed of a rigid impact protective material such as EPS or EPP or of a semi-rigid impact protective material such as vinyl nitrile (VN), VN foam, or other suitable foam or similar material. After completion of custom inner surface 82 by removal of material by a CNC machine comprising a vertical blade, the flat or substantially flat array of segments 116 can then be formed as part of a custom-fitted helmet 81, such as by being inserted into, and coupled to, outer layer 108.

Figure 10A:
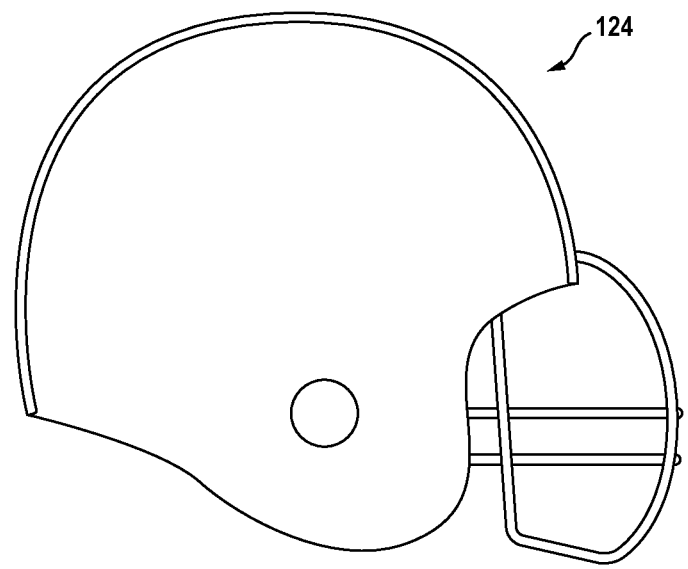
FIGS. 10A and 10B show other embodiments of a custom-fitted helmets.
Figure 10B:
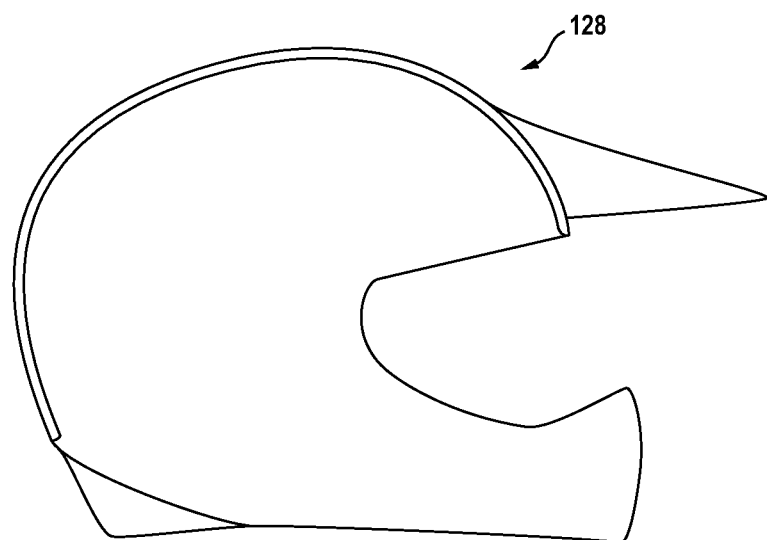

FIGS. 10A and 10B show additional exemplary embodiments of custom-fitted helmets 81, in which portions of the helmets other than just a top inner portion near a crown of user head 30 is customized. For example, by gathering data relating to placement and shape of one or more of a brow, nose, ears, eyes, mouth, cheek, chin, or neck of customer 20, and by knowing how the particular helmet will be used, other customizations may be made. For example, other helmet components that may contact the face or head 30 of customer 20 can be adjusted to comprise a surface or topography that matches a shape, size, or contour, of any feature of customer 20. Additionally, a customer's FOV can be increased by optimizing a position of the customer's eyes relative to a faceport opening or eye openings within the helmet.

Specifically, FIG. 10A shows custom-fitted football helmet 124, and FIG. 10B shows custom-fitted motorcycle helmet 128. Because custom-fitted football helmet 124 and custom-fitted motorcycle helmet 128 include helmet portions, such as the side panels or face guard area that surround sides of the face, cheeks, or both of customer 20, portions of helmets 124 and 128, such as custom panels, can be formed to conform to the face, cheeks, or both of customer 30 for a more comfortable and better fitting helmet. In biking, for example, helmets are worn differently if the biker is touring, staged, or racing position. For bike racing, the helmet can be adapted and conformed to allow the customer to be in a stage or race position without the helmet interfering with the customer's sight based on the particular customer's eye position. Relatedly, a customized neck component for a hockey helmet comprising an inner surface shaped to conform to the customer's neck can also be formed.

It is to be understood that the disclosure is not limited to the exact details of construction, operation, exact materials, or embodiments shown and described, as obvious modifications and equivalents will be apparent to one skilled in the art; for example, the photographs may be digital photographs or paper based photographs that may then be scanned into digital form. While the specific embodiments have been illustrated and described, numerous modifications come to mind without significantly departing from the spirit of the disclosure.

As used herein, the terms "component," "system" and the like in relation to discussions about computer-related processes and systems are intended to refer to a computer-related entity, either hardware, a combination of hardware and software, software, or software in execution. For example, a component may be, but is not limited to being, a process running on a processor, a processor, an object, an instance, an executable, a thread of execution, a program, a computer, or both. By way of illustration, both an application running on a computer and the computer can be a component. One or more components may reside within a process, a thread of execution, or both, and a component may be localized on one computer and/or distributed between two or more computers.

Furthermore, all or portions of the computer-related processes and systems can be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Where the above examples, embodiments and implementations reference examples, it should be understood by those of ordinary skill in the art that other helmet and manufacturing devices and examples could be intermixed or substituted with those provided. In places where the description above refers to particular embodiments of helmets and customization methods, it should be readily apparent that a number of modifications may be made without departing from the spirit thereof and that these embodiments and implementations may be applied to other to helmet customization technologies as well. Accordingly, the disclosed subject matter is intended to embrace all such alterations, modifications and variations that fall within the spirit and scope of the disclosure and the knowledge of one of ordinary skill in the art.

The invention claimed is:

1. A protective sports helmet to be worn by a player while playing a sports activity, the protective sports helmet comprising:
   a helmet shell configured to receive a head of the player; and
   an energy attenuation layer removably positioned within the helmet shell, wherein the energy attenuation layer includes:
   (i) an outer surface that resides adjacent to an inner surface of the helmet shell,
   (ii) an inner surface that resides adjacent to an outer surface of a player's head when the protective sports helmet is worn by the player, and
   (iii) wherein said outer surface and said inner surface define a thickness of the energy attenuation layer that is configured to ensure that when the protective sports helmet is worn by the player, the player's head does not extend through an extent of a helmet safety standard associated with the helmet shell.

2. The protective sports helmet of claim 1, wherein the extent of the helmet safety standard associated with the helmet shell is a certified surface.

3. The protective sports helmet of claim 2, wherein the certified surface is modeled as either: (i) a 3D surface, (ii) a point cloud, (iii) a data array, or (iv) a polygonal mesh.

4. The protective sports helmet of claim 3, wherein the certified surface is generated based on analyzing data collected from a plurality of player's using an electronic handheld device.

5. The protective sports helmet of claim 1, wherein the energy attenuation layer includes a lattice structure formed using a three dimensional printer.

6. The protective sports helmet of claim 5, wherein the inner surface of the energy attenuation layer has a topography that conforms to information derived from data collected from a player's head using an electronic device.

7. The protective sports helmet of claim 1, wherein a computer determines whether the player's head does not extend through the extent of the helmet safety standard associated with the helmet shell.

8. The protective sports helmet of claim 7, wherein the computer determines whether the player's head does not extend through the extent of the helmet safety standard associated with the helmet shell based on a comparison between electronic head data obtained from the player's head using a handheld device and a computerized helmet safety standard.

9. The protective sports helmet of claim 8, wherein the electronic head data obtained from the player's head is modeled as either: (i) a 3D surface, (ii) a point cloud, (iii) a data array, or (iv) a polygonal mesh.

10. A multi-step method of manufacturing a protective sports helmet to be worn by a player while playing a sports activity, the multi-step method comprising the steps of:
obtaining head data from a player using an electronic handheld device;
processing the head data to create a computerized model of the player's head, wherein said computerized model of the player's head includes a brow region;
providing a computerized helmet model including a brow portion; and
aligning the brow region of the computerized model of the player's head with an extent of the brow portion of the computerized helmet model.

11. The multi-step method of claim 10, further comprising the step of rotating the computerized model of the player's head until an extent of a crown portion of the computerized model of the player's head is aligned with a crown region of the computerized helmet model.

12. The multi-step method of claim 10, wherein the step of obtaining head data from a player using the electronic handheld device further includes:
providing a deformable interface member that has a thickness;
placing the deformable interface member over an extent of the player's head; and
capturing images of the deformable interface member that is positioned over the extent of the player's head.

13. The multi-step method of claim 10, wherein the step of obtaining head data from a player using the electronic handheld device includes using a software program installed on the electronic handheld device that guides a person through a process of collecting the head data from the player.

14. The multi-step method of claim 10, wherein the step of obtaining head data from a player using the electronic handheld device includes using a mechanical measurement device that includes contact probes that make contact with the player's head.

15. The multi-step method of claim 10, wherein when the computerized model of the player's head does not extend through an extent of a helmet safety standard associated with the computerized helmet model, further comprising the step of selecting a physical helmet shell that corresponds to the computerized helmet model.

16. The multi-step method of claim 10, further comprising a step of using a three dimensional printer to form a physical energy attenuation layer based upon the computerized model of the player's head.

17. The multi-step method of claim 10, further comprising a step of forming a physical energy attenuation layer from a plurality of separately formed reconfigurable padding components based upon the computerized model of the player's head and the computerized helmet model.

18. The multi-step method of claim 17, wherein the physical energy attenuation layer includes an inner surface with a topography that conforms to a surface that is derived from the computerized model of the player's head.

19. A multi-step method of manufacturing a protective sports helmet to be worn by a player while playing a sports activity, the multi-step method comprising the steps of:
obtaining images of a player's head using an electronic handheld device;
processing the images to create a computerized model of the player's head;
providing a plurality of computerized helmet models; and
selecting a computerized helmet model from the plurality of computerized helmet models based in part upon a comparison between the computerized model of the player's head and at least one computerized helmet model contained in the plurality of computerized helmet models.

20. The multi-step method of claim 19, further comprising the steps of aligning a brow region of the computerized model of the player's head with an extent of a brow portion of the selected computerized helmet model.

21. The multi-step method of claim 19, further comprising the step of moving the computerized model of the player's head until a crown region of the computerized model of the player's head is aligned with a crown portion of the selected computerized helmet model.

22. The multi-step method of claim 19, wherein the step of selecting the computerized helmet model from the plurality of computerized helmet models based in part upon the comparison between the computerized model of the player's head and the at least one computerized helmet model contained in the plurality of computerized helmet models includes the step of finding the smallest size computerized helmet model whose safety standard is satisfied when the computerized model of the player's head is positioned within said safety standard.

23. The multi-step method of claim 22, wherein said safety standard is satisfied when said computerized model of the player's head does not extend through an extent of said safety standard.

24. The protective sports helmet of claim 23, wherein the extent of said safety standard is modeled as either: (i) a 3D surface, (ii) a point cloud, (iii) a data array, or (iv) a polygonal mesh.

25. The multi-step method of claim 19, further comprising the steps of:
obtaining a physical helmet shell that corresponds to the selected computerized helmet model; and
installing a physical energy attenuation layer in the physical helmet shell, wherein the physical energy attenuation layer corresponds to the computerized model of the player's head.

26. The multi-step method of claim 25, wherein the physical energy attenuation layer is formed using a three dimensional printer to create a lattice structure between an inner surface of the physical energy attenuation layer and an outer surface of the physical energy attenuation layer.

27. The multi-step method of claim 25, wherein the physical energy attenuation layer includes an inner surface with a topography that conforms to a surface that is derived from the computerized model of the player's head.

\* \* \* \* \*